United States Patent [19]
Temple et al.

[11] Patent Number: 5,747,162
[45] Date of Patent: May 5, 1998

[54] SUBSTRATES COATED WITH ANTIOXIDANT COMPOSITIONS AND METHOD FOR INHIBITING THE OXIDATION OF SUCH COMPOSITIONS APPLIED TO A SUBSTRATE

[75] Inventors: Chester S. Temple, McKees Rocks; Luciano M. Parrinello, Allison Park, both of Pa.

[73] Assignee: PPG Industries, Inc., Pittsburgh, Pa.

[21] Appl. No.: 797,104

[22] Filed: Feb. 7, 1997

Related U.S. Application Data

[62] Division of Ser. No. 376,581, Jan. 23, 1995, Pat. No. 5,670,355.

[51] Int. Cl.$^6$ ........................................ B32B 27/34
[52] U.S. Cl. ........................ 428/395; 428/392; 428/394
[58] Field of Search ................................ 428/392, 394, 428/395

[56] References Cited

U.S. PATENT DOCUMENTS

| | | | |
|---|---|---|---|
| 3,252,865 | 5/1966 | Klaul | 167/81 |
| 3,936,285 | 2/1976 | Maaghul | 65/3 |
| 4,029,623 | 6/1977 | Maaghul | 260/29.6 |
| 4,038,243 | 7/1977 | Maaghul | 260/40 |
| 4,049,865 | 9/1977 | Maaghul | 428/391 |
| 4,104,434 | 8/1978 | Johnson | 428/273 |
| 4,109,051 | 8/1978 | Cockram | 428/375 |
| 4,271,229 | 6/1981 | Temple | 428/288 |
| 4,295,907 | 10/1981 | Cordts et al. | 264/112 |
| 4,341,677 | 7/1982 | Tamosauskas | 523/421 |
| 4,370,439 | 1/1983 | Melle et al. | 524/513 |
| 4,391,947 | 7/1983 | Sassano | 525/11 |
| 4,394,418 | 7/1983 | Temple | 428/391 |
| 4,448,910 | 5/1984 | Haines et al. | 423/402 |
| 4,483,948 | 11/1984 | Tamosauskas | 523/205 |
| 4,615,946 | 10/1986 | Temple | 428/361 |
| 4,656,084 | 4/1987 | McCoy et al. | 428/266 |
| 4,680,222 | 7/1987 | Anton | 428/251 |
| 4,752,527 | 6/1988 | Sanzero et al. | 428/391 |
| 4,762,750 | 8/1988 | Girgis et al. | 528/378 |
| 4,762,751 | 8/1988 | Girgis et al. | 428/378 |
| 4,806,580 | 2/1989 | Bock et al. | 524/110 |
| 4,853,279 | 8/1989 | Shibata et al. | 428/267 |
| 4,933,381 | 6/1990 | Hager | 523/414 |
| 4,935,455 | 6/1990 | Huy et al. | 522/99 |
| 5,219,656 | 6/1993 | Klett et al. | 528/378 |
| 5,234,750 | 8/1993 | Akao | 428/219 |
| 5,258,422 | 11/1993 | Chang et al. | 523/124 |
| 5,308,549 | 5/1994 | Laermer et al. | 252/399 |

FOREIGN PATENT DOCUMENTS

| | | |
|---|---|---|
| 666283A1 | 8/1995 | European Pat. Off. . |
| 231086A1 | 12/1985 | German Dem. Rep. . |
| 54-55043 | 5/1979 | Japan . |
| 80050900B | 12/1980 | Japan . |
| 83003983 | 1/1983 | Japan . |
| 62-86036 | 4/1987 | Japan . |
| 62-164771 | 7/1987 | Japan . |
| 2269876 | 5/1990 | Japan . |
| 2-372551 | 8/1990 | Japan . |
| 04175332A | 6/1992 | Japan . |
| 05287219A | 11/1993 | Japan . |
| 05293370A | 11/1993 | Japan . |
| 286219 | 8/1993 | U.S.S.R. . |
| 703935 | 2/1954 | United Kingdom . |
| 813535 | 5/1959 | United Kingdom . |
| WO93/01051 | 1/1993 | WIPO . |
| WO 93/10175 | 5/1993 | WIPO . |

OTHER PUBLICATIONS

*Encyclopedia of Composite Materials and Components* 1983, pp. 221–227, John Wiley & Sons.
*The Merck Index*, 9th Ed., 1976, pp. 110–111, 236–237, 1221–1222, 1287–1292.
*The Merck Index*, 11th Ed., 1989, pp. 282–283, 1298–1299, 1495 and 1579–1580.
*The Manufacturing Technology of Continuous Glass Fibres*, 2 Ed., 1983, K. L. Loewenstein, pp. 169–177, 224–230, 243–295.
*Organic Chemistry*, 4th Ed., 1980, S. H. Pine et al. pp. 543–550, 664, 674, 728–729, 782, 818, 887, 982.
"Use of Biological Antioxidants as Polypropylene Stabilizers" by S. F. Laermer and F. Nabholz, *Plastics and Rubber Processing and Applications*, vol. 14, No. 4, 1990, pp. 235–239.
"Inhibiting Nitrosamine Formation in Rubber" by S. F. Laermer and R. Schuster, reprint from *Rubber & Plastics News*, May 28, 1990.
"Antioxidants, The Hunt for BHT Alternatives" by Richard Monks, *Plastics Technology*, Jul. 1992.
"Update on Antioxidants and UV Stabilizers", Marcie McMurrer, editor, *Plastics Compounding*, Mar./Apr. 1991.
"Interest rises in polymer additives as end–users become more sophisticated" and The technical advantages of vitamine E as an antioxidant, *Spectratech Times*, First Quarter 1992, pp. 1–4.

(List continued on next page.)

*Primary Examiner*—Helen Lee
*Attorney, Agent, or Firm*—Ann Marie Odorski

[57] ABSTRACT

The present invention includes curable compositions adapted to coat substrates. In one embodiment, the composition includes an antioxidant selected from terpene materials; vitamin materials different from the terpene materials; and combinations thereof in an amount of about 0.00001 weight percent to about 5 weight percent based upon the weight of the substrate. In another embodiment, the composition includes (a) an antioxidant selected from terpene materials; vitamin materials different from the terpene materials; and combinations thereof in an amount effective to inhibit oxidation of the composition; and (b) a film-forming material capable of forming a substantially uniform continuous coating on the substrate. Also included are substrates and sized glass fibers coated with such compositions and fabrics woven from such coated fibers. Other aspects of the present invention include methods for inhibiting the oxidation of a coating composition adapted to coat substrates.

29 Claims, No Drawings

OTHER PUBLICATIONS

"Interest Grows in Vitamin E as Antioxidant for Packaging Films", excerpt from *Packaging*, Jul., 1992.

"Vitamin E Gets Second Look as Antioxidant" by Dan Charnas, *Plastics News*, Jun. 8, 1992.

"Here's Another Role for Vitamin E: Stabilizing Polyolefins", *Plastics Technology*, Technology Newsfocus, May 1992.

"Vitamin E Performs as Polymer Antioxidant", *Plastics Compounding*, Jan./Feb. 1993.

"Quantum", Additives Annual '92, *Plastics*.

"Carbon Fibers", *Modern Plastics*, Mid–Oct. 1991, pp. 208–210.

"Vitamin E As An Antioxidant", *Plastics Technology*, Mar. 1993.

"Why is RONOTEC® 201 the Smarter AO?", Hoffmann–LaRoche Inc. Product Bulletin Oct. 1992.

"Why is Ronotec® 201 (Vitamin E) The Smarter AO?", *Plastics Compounding*, Nov./Dec. 1994, p. 16.

RONOTEC® 201 Product Data Sheet, May 1990, Hoffmann–LaRoche Inc.

Material Safety Data Sheets for RONOTEC® 201, pp. 1–4, Hoffman–La Roche Inc. Sep. 29, 1989.

Material Safety Data Sheets for RONOTEC® 202, pp. 1–4, Jul. 20, 1992, Hoffmann–La Roche Inc.

RONOTEC® CF–120 Product Data Sheet, Hoffmann–LaRoche Inc.

Letter from Peter F. Zambetti II of Hoffman–LaRoche Inc. to Mr. Chet Temple, PPG Industrial Fiberglass Research, dated Mar. 12, 1993.

Quality Control Bulletin for Ascorbyl Palmitat FCC, Apr. 12, 1993, and ASC Acid FP USP–FCC, Sep. 11, 1992, Hoffmann–LaRoche.

*Hawley's Condensed Chemical Dictionary*, 12th Ed., 1993, pp. 90, 99, 226, 331, 470–471, 737, 861, 915, 975, 1123, 1141–1142, 1156, 1220.

*Kirk–Othmer Encyclopedia of Chemical Technology*, 2d Ed., 1966, vol. 2, pp. 588–604 and 747–761; vol. 8, pp. 781; vol. 10, p. 14; vol. 18, pp. 837–838; vol. 19, pp. 803–838; vol. 20, pp. 173–183; vol. 21, pp. 490–508, 542–571, 574–600.

"Shell Resins EPI–REZ® CMD 5520–W–60 Waterborne Resin", Technical Bulletin of Shell Chemical Company (Apr. 1994).

"Colorants" by J. Michael McKinney, *Handbook of Plastic Materials and Technology*, pp. 789–797.

"Reinforced Plastics, Filament Winding" by A. M. Shibley, *Handbook of Plastic Materials and Technology*, pp. 955–972.

"Reinforced Plastics, Thermoset Matched–Die Molding" by Raymond W. Meyer, *Handbook of Plastic Materials and Technology*, pp. 973–1038.

"Reinforced Plastics, Pultrusion" by W. Brandt Goldsworthy, *Handbook of Plastic Materials and Technology*, pp. 1039–1062.

"Extrusion" by Christiaan Rauwendaal, *Handbook of Plastic Materials and Technology*, pp. 1179–1215.

"Injection Molding (IM)" by Irvin I. Rubin, *Handbook of Plastic Materials and Technology*, pp. 1225–1271.

"Alpha–Tocopherol (Vitamin E)–The Natural Antioxidant for Polyolefins" by S. F. Laermer and P. F. Zambetti, *Journal of Plastic Film & Sheeting*, vol. 8, Jul. 1992, pp. 228–248.

SUBSTRATES COATED WITH ANTIOXIDANT COMPOSITIONS AND METHOD FOR INHIBITING THE OXIDATION OF SUCH COMPOSITIONS APPLIED TO A SUBSTRATE

This application is a division of U.S. Ser. No. 376,581, filed Jan. 23, 1995, now U.S. Pat. No. 5,670,355.

CROSS REFERENCE TO RELATED APPLICATIONS

This patent application is related to the copending U.S. Patent Application of Chester S. Temple, Luciano Parrinello and Rajgopal Subramanian entitled "Reinforced Polymeric Composites and Methods of Reinforcing a Polymeric Material", filed concurrently with the present patent application.

FIELD OF THE INVENTION

This invention relates generally to compositions including an antioxidant which are applied to substrates and substrates coated with the same. More particularly, this invention relates to compositions which include an antioxidant vitamin, terpene or terpene derivative for coating glass fibers.

BACKGROUND OF THE INVENTION

Typically, the surfaces of glass fiber substrates are coated with a sizing composition during the forming process to protect the glass fibers from interfilament abrasion. Such sizing compositions can include as components film-formers, lubricants, coupling agents, emulsifiers, antioxidants, ultraviolet light stabilizers, colorants, antistatic agents and water, to name a few.

U.S. Pat. No. 5,219,656 discloses a composition for treating glass fibers including a film forming polymer, organo coupling agent, filament lubricant, allylic compound and optionally including hindered phenol, diaryl amine, thioether, quinone or phosphate antioxidants.

Japanese Patent Application No. 05293370A (abstract) discloses a deodorizing filter comprising a deodorizing fiber prepared by adhering to an active carbon fiber 10 to 50 weight percent of a ferrous salt and 10 to 30 weight percent tocopherol (based upon the weight of the active carbon fiber), the deodorizing fiber being fused to a thermoplastic synthetic fiber.

Sized glass fibers are typically gathered into a strand, wound to form a forming package, and dried. Optionally, a secondary coating can be applied to the strands. Alternatively, the strands may be heat cleaned and slashed with a finish, for example a starch-based finish.

The strands can be further processed by twisting into a yarn, chopping, combination in parallel to form a bundle or roving, weaving into a cloth or forming into a chopped or continuous strand mat, for example. The coated strands can be used in a wide variety of applications, such as overwrap reinforcements for optical fiber cables and cloth for printed circuit boards, for example.

In processing, the components of the coating on the glass fibers can cause auto-oxidation of the coating. Also, exposure to oxygen and ozone in the air, as well as the matrix materials which the coated glass fibers contact and secondary treatments applied to the coated glass fibers, can cause oxidation and degradation of the coating and materials. Oxidation of the glass fiber coating and contacting materials can produce discoloration, reduced thermal stability, mechanical property loss and surface defects such as powdering, fiber prominence and matrix material discoloration in molded products which include the coated glass fibers. Therefore, it is desirable to provide a coating to the glass fibers which inhibits such oxidation.

SUMMARY OF THE INVENTION

The present invention provides compositions adapted to coat a substrate. One aspect of the present invention is a curable composition comprising an antioxidant selected from the group consisting of (a) terpene materials; (b) vitamin materials different from the terpene materials; and (c) combinations thereof in an amount of about 0.00001 weight percent to about 5 weight percent based upon the weight of the substrate. Another aspect of the present invention is a curable composition comprising: (a) an antioxidant selected from the group consisting of (1) terpene materials; (2) vitamin materials different from the terpene materials; and (3) combinations thereof in an amount effective to inhibit oxidation of the composition; and (b) a film-forming material capable of forming a substantially uniform continuous coating on the substrate.

Other aspects of the present invention include substrates including sized glass fibers coated with such compositions and fabrics woven from such coated fibers.

The present invention also provides methods for inhibiting the oxidative degradation of a coated substrate. The methods comprise applying to the substrate one of the above curable compositions in an amount effective to inhibit oxidation of the coated substrate and drying the curable composition to form a substantially uniform coating upon the substrate.

BRIEF DESCRIPTION OF THE DRAWINGS

The foregoing summary, as well as the following detailed description of the preferred embodiments, will be better understood when read in conjunction with the appended drawing. In the drawing:

FIG. 1 is a top plan view of a portion of a woven fabric according to the present invention.

DETAILED DESCRIPTION OF THE PREFERRED EMBODIMENTS

The curable compositions of the present invention which contain antioxidants are believed to inhibit oxidation and degradation and thereby prevent discoloration and provide thermal stability to the curable compositions and materials which the treated or coated substrate contacts.

The curable compositions of the present invention comprise one or more antioxidants which are selected from one or more antioxidant terpene materials and/or one or more antioxidant vitamin materials which are different from the terpene materials. As used herein, the term "antioxidant" is hereby defined to be a material which inhibits oxidation, degradation or rancidity of another material or acts as a free radical scavenger. See *Hawley's Condensed Chemical Dictionary* (12th Ed. 1993) at page 90, which is hereby incorporated by reference. The term "oxidation", as used herein, is defined to mean any reaction in which electrons are transferred. *Hawley's* at page 861, which is hereby incorporated by reference.

Antioxidant materials useful in the present invention generally have a volatilization temperature greater than the processing temperature to which the materials will be subjected, generally up to about 400° C., and preferably up to about 350° C.

As used herein, the term "curable" means (1) the compositions of the present invention are capable of being at least partially dried by air and/or heat; and/or (2) the antioxidant, other components of the compositions and/or substrate are capable of being crosslinked to each other to change the physical properties of the compositions. See *Hawley's* at page 331, which is hereby incorporated by reference.

A "terpene" is hereby defined to mean an unsaturated hydrocarbon based on one or more isoprene units. *Hawley's* at page 1123, S. Pine et al., *Organic Chemistry* (4th Ed. 1980) at pages 543–550 and *Kirk-Othmer Encyclopedia of Chemical Technology* Vol. 19 (2d Ed. 1966) at pages 803–838, each of which is hereby incorporated by reference. A "terpenoid" as used herein means a derivative of a terpene. *Hawley's* at page 1123. As used herein, the phrase "terpene materials" includes terpenes and terpenoids.

Terpene materials useful in the present invention include monoterpenes (2 isoprene units), sesquiterpenes (3 isoprene units), diterpenes (4 isoprene units), triterpenes (6 isoprene units) and tetraterpenes (8 isoprene units). Suitable terpene materials can be broadly classified as aliphatic, aromatic and/or cyclic. Cyclic terpene materials can be acyclic, monocyclic, bicyclic or polycyclic.

Many terpene materials, as will be discussed in detail below, are also vitamins which contain an isoprene unit and derivatives thereof. The term "vitamin" as used herein means a complex organic compound, present in natural products or made synthetically, which is essential in the diet of animals and man. *Hawley's* at page 1220, which is hereby incorporated by reference. The term "provitamin" is defined herein as a precursor of a vitamin. *Hawley's* at page 975, which is hereby incorporated by reference.

As used herein, the phrase "vitamin materials" means a provitamin, vitamin or derivative thereof which is different from the terpene materials, and is preferably essentially free of the terpene materials (contains less than about 1 weight percent of the terpene materials). More preferably, the vitamin materials are free of terpene materials.

Non-limiting examples of useful terpene materials which are vitamins or derivatives thereof include vitamin A terpene materials, vitamin B terpene materials, vitamin D terpene materials, vitamin E terpene materials, vitamin K terpene materials and their provitamins and derivatives.

Suitable antioxidant vitamin A terpene materials useful in the present invention include retinol, 3,4-didehydroretinol, retinal, vitamin A acetate, vitamin A palmitate, α-carotene, β-carotene, δ-carotene, γ-carotene, cryptoxanthin, isomers thereof and derivatives thereof.

Vitamin A or retinol (3,7-dimethyl-9-(2,6,6-trimethyl-1-cyclohexen-1-yl)-2,4,6,8-nonatetraen-1-ol) is a pale yellow crystalline solid having a molecular weight of about 286.44 and a melting point of about 62° C. to about 64° C. *Kirk-Othmer* Vol. 21 at page 490–508 and *The Merck Index* (9th Ed. 1976) at page 1287, each of which is hereby incorporated by reference. Vitamin A distills at a temperature of about 120°–125° C. at a pressure of about $5\times10^{-3}$ millimeters. The structure of vitamin A is shown in formula (I) below:

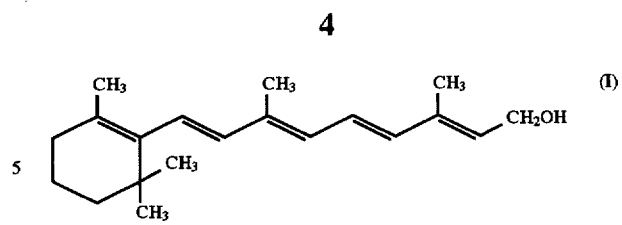

As shown in formula (I), vitamin A includes a diterpene side chain and can therefore be broadly classified as a terpenoid. *Kirk-Othmer* at page 491. Isomers of vitamin A include 13-cis, 9-cis, 9,13-di-cis, 11-cis and 11,13-di-cis isomers.

Vitamin A occurs naturally in animal organisms and can be extracted from fish liver oils, where it occurs mostly in esterified form (typically palmitate). *Kirk-Othmer* at page 490 and *Merck* 9th Ed. at page 1287. Vitamin A can also be produced by synthesis from β-ionone, as discussed in detail in *Organic Chemistry* at pages 728–729, which is hereby incorporated by reference and *Kirk-Othmer* at pages 495–497. Vitamin A is also an oxidation product of carotenoids such as alpha-, beta- or gamma-carotenes. Other methods of preparing vitamin A are discussed in *Merck* 9th Ed. at page 1287. Vitamin A terpene materials are commercially available from Aldrich Chemical Company of Milwaukee, Wis.

Vitamin A is readily oxidized by atmospheric oxygen, particularly in the presence of light and heat. Esters of vitamin A are more stable to oxidation. Vitamin A is practically insoluble in water or glycerol and is soluble in absolute alcohol, methanol, chloroform, ether fats and oils. Vitamin A acetate and vitamin A palmitate are also believed to be useful as antioxidant vitamin A terpene materials in the present invention.

Vitamin $A_2$ or 3,4-Didehydroretinol is another suitable vitamin A terpene material useful in the present invention. Vitamin $A_2$ is a crystalline solid in all-trans form and golden yellow oil as a stereoisomeric mixture. *Kirk-Othmer* Vol. 21 at page 501 and *Merck* 9th Ed. at page 1287. Vitamin $A_2$ also exists in a cis form. *The Merck Index* (11th Ed.) at page 1298–1299, which is hereby incorporated by reference. Vitamin $A_2$ has a molecular weight of about 284.42 and the all-trans form has a melting point of about 63° C. to about 65° C. The structure of vitamin $A_2$ is shown in formula (II) below:

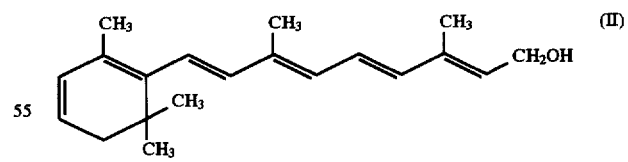

Vitamin $A_2$ can be isolated from pike liver oils. Various synthesis methods for vitamin $A_2$ are discussed in *Merck* 9th Ed. at page 1287. Vitamin $A_2$ is readily affected by oxygen.

Another useful vitamin A terpene material is vitamin A aldehyde or retinal, which is an orange crystalline material having a melting point of about 61° C. to about 64° C. *Merck* 9th Ed. at page 1287. The structure of vitamin A aldehyde is shown in formula (III) below:

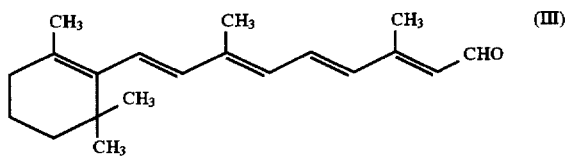

(III)

Vitamin A aldehyde can be isolated from retinas or prepared by the oxidation of vitamin A or β-carotene, for example. Merck 9th Ed. at page 1287. Vitamin A aldehyde is soluble in ethanol, chloroform, cyclohexane, petroleum ether and oils.

Other examples of vitamin A terpene materials which are believed to be useful in the present invention include the provitamins A, namely alpha(α)-carotene, beta(β)-carotene, gamma(δ)-carotene, sigma(γ)-carotene and cryptoxanthin (3-hydroxy-beta-carotene), which are discussed generally in Merck 9th Ed. at pages 236–237, which are hereby incorporated by reference. The carotenes are members of a large class of pigments called carotenoids and can be broadly classified as tetraterpenes. The melting points of the carotenes are as follows: alpha-carotene is about 187.5° C.; beta-carotene is about 183° C.; gamma-carotene is about 152–153.5° C. and in natural form about 177.5° C.; and sigma-carotene is about 140.50° C. Merck 11th Ed. at pages 282–283, which are hereby incorporated by reference.

The structures of α-carotene, β-carotene, δ-carotene and γ-carotene are set forth in formulas (IV) through (VII) below:

fungi, bacteria and algae. The carotenoids can be derived by extraction from carrots and palm oil or concentration by chromatographic process from alfalfa. Beta-carotene can also be made by microbial fermentation process from corn and soybean oil. Other synthesis methods are discussed in Merck 9th Ed. at pages 236–237, which are hereby incorporated by reference.

The carotenoids are generally easily oxidized by air and are insoluble in water, slightly soluble in alcohol and soluble in chloroform, ethers and benzene. The carotenoids are commercially available in the form of crystals, solutions in oils and colloidal dispersions.

Non-limiting examples of antioxidant vitamin B terpene materials useful in the present invention include thiamine (vitamin $B_1$), cyanocobalamin (vitamin $B_{12}$), isomers thereof and derivatives thereof.

Thiamine (3-(4-amino-2-methylpyrimidyl-5-methyl)-4-methyl-5, β-hydroxy-ethylthiazolium chloride) occurs in nature in the form of its salts, esters with phosphoric acids, or as a pyrophosphoric acid ester-protein-metal complex (carboxylase). Kirk-Othmer Vol. 20 at pages 173–183, Organic Chemistry at page 674 and Hawley's at pages 1141–1142, which are hereby incorporated by reference. It is present in high concentrations in seeds and in small amounts throughout animal organisms. Kirk-Othmer Vol. 20 at page 173. The synthesis of thiamine is discussed in Kirk-Othmer Vol. 20 at pages 177–180. Thiamine materials are commercially available from Sigma Chemical Company of St. Louis, Mo., Aldrich Chemical Company of

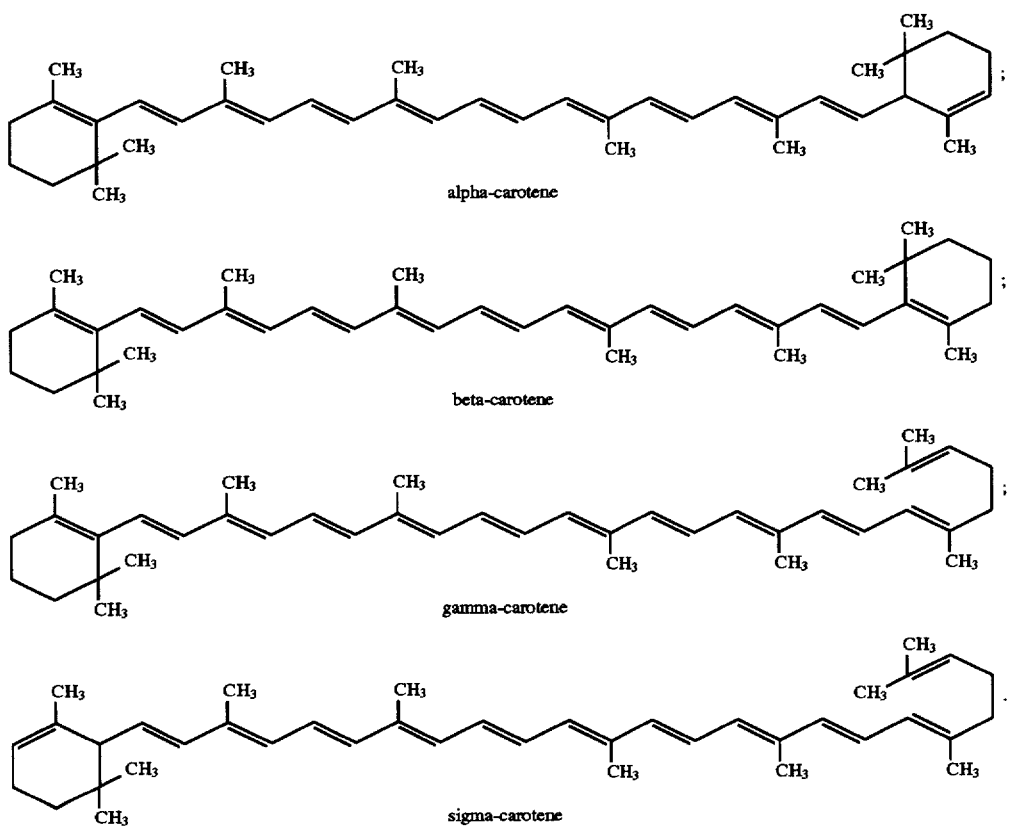

The carotenoids are yellow to red in color and generally crystalline. Kirk-Othmer Vol. 21 at page 502. The carotenoids occur naturally in green plants and many species of Milwaukee, Wis. and Hoffmann-LaRoche Inc. of Nutley, N.J. The thiazolium moiety is readily oxidized by air. Kirk-Othmer Vol. 20 at page 174.

Cyanocobalamin is a red crystalline cyano cobalt complex. *Kirk-Othmer* Vol. 21 at pages 542–548, which is hereby incorporated by reference. Cyanocobalamin is unstable to both oxidizing and reducing agents. *Kirk-Othmer* Vol. 21 at page 543. Cyanocobalamin occurs in many animal products and is generally produced commercially by fermentation, as discussed in detail in *Kirk-Othmer* Vol. 21 at pages 544–547.

Non-limiting examples of suitable antioxidant vitamin D terpene materials for use in the present invention include ergocalciferol (vitamin $D_2$), cholecalciferol (vitamin $D_3$), 25-hydroxycholecalciferol, 22,23-dihydroergocalciferol (vitamin $D_4$), isomers thereof and derivatives thereof. See *Kirk-Othmer* Vol. 21 at pages 549–571, which is hereby incorporated by reference. Each of these examples of antioxidant vitamin D terpene materials are acyclic terpene materials.

Ergocalciferol (9,10-Secoergosta-5,7,10(19),22-tetraen-3β-ol) is a white odorless crystalline material having melting point of about 115° C. to about 118° C. and a molecular weight of about 396.63. *Hawley's* at page 470–471 and *Merck* 9th Ed. at pages 1289–1290, which are hereby incorporated by reference. The structure of ergocalciferol is given in formula (VIII) below:

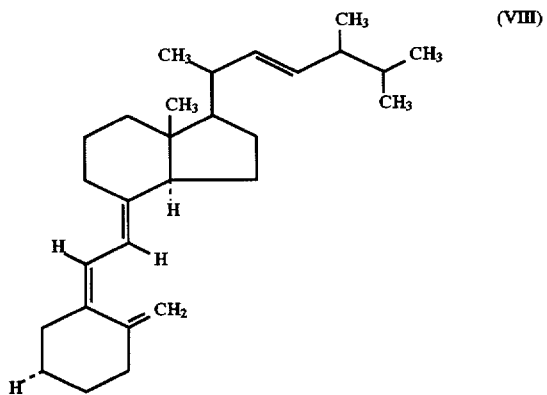

Ergocalciferol is derived from ergosterol by irradiation by UV light (275–300 nanometers) in a suitable solvent and can be produced by a variety of other methods. See *Merck* 9th Ed. at page 1289 and *Kirk-Othmer* Vol. 18 at pages 837–838, which is hereby incorporated by reference. Ergocalciferol is insoluble in water and soluble in alcohol and fatty oils and can be oxidized and inactivated by moist air within a few days.

Another useful vitamin D terpene material is cholecalciferol (9,10-Secocholesta-5,7,10(19),22-trien-3β-ol or vitamin $D_3$), which is a fine needlelike material having a melting point of about 84° C. to about 85° C. and a molecular weight of about 384.62. *Merck* 9th Ed. at page 1289. The structure of cholecalciferol is given in formula (IX) below:

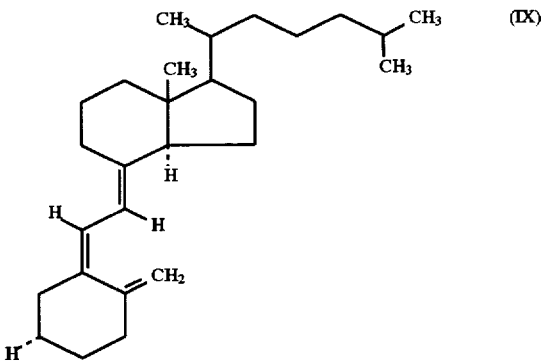

Cholecalciferol occurs in and is isolated from fish liver oils. *Merck* 9th Ed. at 1289. Methods of separation include chromatography, molecular distillation, esterification and fractionation of the esters. *Merck* 9th Ed. at 1289. Cholecalciferol can also be produced by irradiation of provitamin 7-dehydrocholesterol.

Cholecalciferol is insoluble in water, soluble in conventional organic solvents, slightly soluble in vegetable oils and can be oxidized and inactivated by moist air within a few days. *Merck* 9th Ed. at 1289–1290. Cholecalciferol is considered more stable than ergocalciferol. *Merck* 9th Ed. at 1290.

Preferred antioxidants for use in the present invention include vitamin E terpene materials. Useful antioxidant vitamin E terpene materials include tocol, alpha($\alpha$)-tocopherol, beta($\beta$)-tocopherol, gamma($\gamma$)-tocopherol, sigma($\delta$)-tocopherol, epsilon($\epsilon$)-tocopherol, $xi_1(\xi_1)$-tocopherol, $xi_2(\xi_2)$-tocopherol, eta($\eta$)-tocopherol, isomers thereof and derivatives thereof.

Tocol (2-methyl-2-(4,8,12-trimethyltridecyl)-6-chromanol) and its derivatives are noted for antioxidant activity. *Merck* 9th Ed. at page 1221, which is hereby incorporated by reference. Tocol is a colorless viscous oil having a molecular weight of about 388.61 and a boiling point of about 165° C. to about 175° C. at 0.001 atm. *Merck* 9th Ed. at page 1221. The structural formula of tocol is given in formula (X) below:

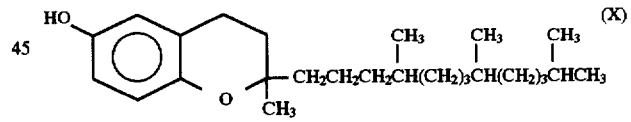

Tocol can be produced by condensation of hydroquinone and phytol in the presence of anhydrous formic acid. *Merck* 9th Ed. at page 1221.

Tocopherols are methyl derivatives of tocol. *Kirk-Othmer* Vol. 21 at pages 575–585, which is hereby incorporated by reference. Alpha-tocopherol is a clear yellow viscous oil having a refractive index of about 1.5030 to about 1.5070 at 20° C. *Hawley's* at page 1156, which is hereby incorporated by reference. Alpha-tocopherol does not volatilize until almost 300° C. S. Laermer and P. Zambetti, "Alpha-Tocopherol (Vitamin E)-The Natural Antioxidant for Polyolefins", *Journal of Plastic Film and Sheeting* Vol. 8 (July 1992) at pages 228–248; 229. The boiling point of alpha-tocopherol is about 200° to about 220° C. at 0.1 atm. *Merck* 11th Ed. at page 1579, which is hereby incorporated by reference.

The structure of alpha-tocopherol or vitamin E (2,5,7,8-Tetramethyl-2-(4',8',12'-trimethyltridecyl)-6-chromanol) is set forth in formula (XI) below:

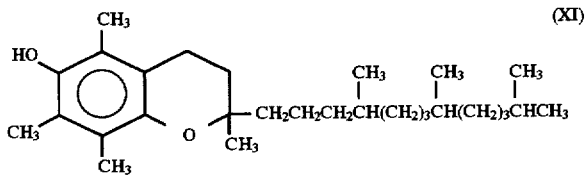

(XI)

Alpha-tocopherol is soluble in fats, insoluble in water and unstable to ultraviolet light, oxidation and alkalis. Hawley's at page 1156. Alpha-tocopherol is chiefly found in plant materials and is present in highest concentrations (0.1–0.3%) in wheat germ, corn, sunflower, seed, rapeseed and soybean oils, alfalfa and lettuce. Merck 9th Ed. at page 1290. When found in nature, α-tocopherol usually occurs as a d-isomer with other tocopherols. Hawley's at page 1156.

Alpha-tocopherol is a preferred antioxidant vitamin terpene material for use in the present invention. Alpha-tocopherol is commercially available in USP (United States Pharmacopoeia), technical and crude grades from Hoffmann-LaRoche Inc. of Nutley, N.J. Ronotec® 201 is a yellowish to brownish viscous oil having at least 92% - dl-α-tocopherol which is commercially available from Hoffmann-LaRoche Inc. for technical purposes as antioxidants in polymers and oils. Ronotec® 201 Product Data Sheet May 1990 of Hoffmann-LaRoche Inc.

Another suitable alpha-tocopherol-containing product which is commercially available from Hoffmann-LaRoche Inc. is Ronotec® 200, which is a crude grade of vitamin E material. Ronotec® 202 is a USP grade vitamin E material commercially available from Hoffmann-LaRoche Inc. having at least 96α-tocopherol which is suitable for use in the present invention. See Ronotec® 202 Material Data Safety Sheet Jul. 20, 1992 of Hoffmann-LaRoche Inc. Another useful alpha-tocopherol-containing product is Ronotec® 202C which has about 10% α-tocopherol and proprietary stabilizers and color suppressants. See M. McMurrer (Ed.), "Update On Antioxidants and UV Stabilizers", Plastics Compounding March/April 1991 and S. Laermer et al., "Alpha-Tocopherol (Vitamin E)-The Natural Antioxidant for Polyolefins" at page 232. Ronotec® DF-120, also commercially available from Hoffmann-LaRoche Inc., which includes about 20% of the Ronotec 201 formulation, is also an example of an alpha-tocopherol-containing material useful in the present invention.

Another useful alpha-tocopherol-containing material is Ronotec® CF-120, which has at least 18.4% d,l-alpha-tocopherol and functional food grade/GRAS (Generally Recommended As Safe) carriers, contains no phosphites and is hydrolytically stable. Ronotec® CF-120 Product Data Sheet of Hoffmann-LaRoche Inc. The formulation of Ronotec® CF-120 is believed to be disclosed in U.S. Pat. No. 5,308,549, which is hereby incorporated by reference. Ronotec® CF-120 Product Data Sheet of Hoffmann-LaRoche Inc.

Alpha-tocopherol is an antioxidant and stabilizer for fats. Alpha tocopherol is disclosed in S. Laermer et al., "Alpha-Tocopherol (Vitamin E)-The Natural Antioxidant for Polyolefins" as an antioxidant and melt and color stabilizer for polyolefins such as polypropylene and polyethylene and in combination with phosphite and thioester secondary antioxidants.

Beta-tocopherol (2,5,8-trimethyl-2-(4,8,12-trimethyltridecyl)-6-chromanol) obtained from natural sources typically accompanies α-tocopherol and γ-tocopherol. Merck 9th Ed. at page 1221. Beta-tocopherol is a pale yellow, viscous oil which has a molecular weight of about 416.66 and boiling point of about 200° to about 210° C. Merck 11th Ed. at page 1495 and Merck 9th Ed. at page 1221. The structure of β-tocopherol is given in formula (XII):

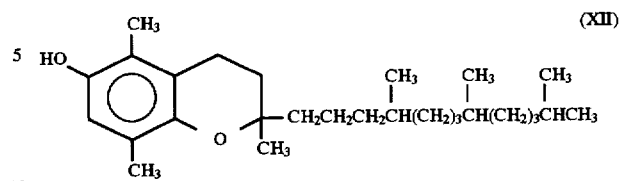

Beta-tocopherol is biologically less active than α-tocopherol. Merck 9th Ed. at page 1221. It may be separated by fractional crystallization of allophanates as discussed in Merck 9th Ed. at page 1221. Beta-tocopherol is insoluble in water and freely soluble in oils, fats, acetone, alcohol, chloroform, ether and other fat solvents. Merck 9th Ed. at page 1221. Beta-tocopherol is very stable to heat and alkalis and is slowly oxidized by atmospheric oxygen. Merck 9th Ed. at page 1221.

Another useful terpene material is gamma-tocopherol (2,7,8-trimethyl-2-(4,8,12-trimethyltridecyl)-6-chromanol) which is a pale yellow, viscous oil which is biologically less active than alpha-tocopherol. Merck 9th Ed. at page 1221. Gamma-tocopherol has a boiling point of about 200° C. to about 210° C. at 0.1 atm. Merck 11th Ed. at page 1495. It may be separated by fractional crystallization as is beta-tocopherol. Merck 9th Ed. at page 1221. Gamma-tocopherol is insoluble in water, freely soluble in oils, fats, acetone, alcohol, chloroform, ether and other fat solvents. Merck 9th Ed. at page 1221. Gamma-tocopherol is very stable to heat and alkalis and is slowly oxidized by atmospheric oxygen. Merck 9th Ed. at page 1221. The structure of γ-tocopherol is given in formula (XIII):

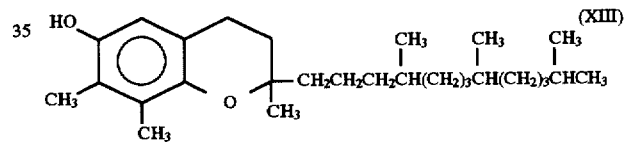

Sigma-tocopherol (3,4-Dihydro-2,8-dimethyl-2-(4,8,12-trimethyltridecyl)-2H-1-benzopyran-6-ol) is also a pale yellow, viscous oil and has a molecular weight of about 402.64. Merck 9th Ed. at pages 1221–1222, which is hereby incorporated by reference. The structure of δ-tocopherol is given in formula (XIV) below:

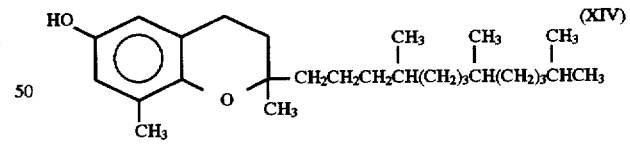

Sigma-tocopherol, which is claimed in Merck 9th ed. at page 1222 to be the most potent antioxidant of the tocopherols, constitutes about 30% of the mixed tocopherols in soybean oil and 5% of the tocopherols in wheat germ oil. Merck 9th Ed. at page 1222. Sigma-tocopherol can also be found in cottonseed and peanut oils. Merck 9th Ed. at page 1222.

Other tocopherols believed to be useful in the present invention include ε-tocopherol (2,5,8-trimethyl-2-(4,8,12-trimethyltrideca-3,7,11-trienyl)-chromanol), $\xi_1$-tocopherol (2,5,7,8-tetramethyl-2-(4,8,12-trimethyl-3,7,11-tridecatrienyl)-6-chromanol), $\xi_2$-tocopherol (2,5,7-trimethyl-2-(4,8,12-trimethyltridecyl)-6-chromanol) and η-tocopherol (2,7-dimethyl-2-(4,8,12-trimethyltridecyl)-6-chromanol). The characteristics of these materials are similar to the tocopherols discussed above and are disclosed in *Merck* 9th Ed. at page 1222. Also believed to be useful in the present invention as terpene materials are methyl derivatives of tocotrienol (2-methyl-2-(4', 8', 12'-trimethyltrideca-3', 7', 11'- trienyl)-6-chromanol), such as α-tocotrienol. See *Kirk-Othmer* Vol. 21 at page 574.

Antioxidant vitamin K terpene materials useful in the present invention include phytonadione, menaquinone, isomers thereof and derivatives thereof.

Phytonadione or vitamin $K_1$ (2-methyl-3-phytyl-1,4-naphthoquinone) is a naphthoquinone with a terpenoid side chain. Organic Chemistry at page 664, which is hereby incorporated by reference. Phytonadione is a clear yellow viscous odorless liquid which is insoluble in water, soluble in vegetable oils and slightly soluble in alcohol. *Merck* 9th Ed. at page 1291 and *Kirk-Othmer Vol.* 21 at pages 585–600, which are hereby incorporated by reference. Phytonadione is a fat soluble vitamin occurring naturally as the trans isomer in alfalfa and other green plants, and can be derived synthetically from 2-methyl-1,4-naphthoquinone and phytol. *Hawley's* at page 915, which is hereby incorporated by reference. Phytonadione is generally stable to air and moisture but unstable in sunlight. *Hawley's* at page 915.

Menaquinone (vitamin $K_2$) is a naphthoquinone with terpenoid side chains. Menaquinone has a melting point of about 54° C. *Merck* 11th Ed. at page 1580, which is hereby incorporated by reference.

The antioxidant terpene materials useful in the present invention include other terpenes and terpenoids in addition to those discussed above. For example, other useful terpene materials include other 6-chromanol compounds having the same substitution patterns on the benzene moiety as α-, β-, γ- and δ- tocopherols and two methyl groups or a methyl and a hydroxymethyl group at the 2-position, such as 2,2,5,7,8-pentamethylchroman-6-ol and 2-hydroxymethyl-2,5,7,8-tetramethylchroman-6-ol.

Suitable terpene materials for use in the curable composition of the present invention can contain an aromatic ring having an aliphatic terpene substituent. The aromatic ring can comprise one or more benzene rings, but is preferably a benzene ring or naphthalene ring.

The terpene material can further comprise one or more heterocyclic rings fused with the aromatic ring. Useful heterocyclic rings can have 5, 6 or 7 carbon atoms in the ring structure and can be partially or fully conjugated, although preferably the heterocyclic ring is not conjugated.

Preferred heterocyclic rings have a heteroatom in a ortho position to a bridge carbon atom of the aromatic ring. Suitable heteroatoms include oxygen, sulfur and phosphorus.

The heterocyclic ring can have other substituents, such as hydrogen, aliphatic groups or alkenyl groups. Suitable alkyl groups or alkenyl groups can contain about 1 to about 50 carbon atoms. Preferably the alkyl or alkenyl groups contain about 1 to about 35 carbon atoms, and more preferably about 5 to about 25 carbon atoms. The alkyl or alkenyl group can include a terminal group such as a hydroxyl, thiol or aromatic group such as a benzyl group. The alkyl or alkenyl groups can be branched or straight chain, and include substituents such as alkyl groups having about 1 to about 3 carbon atoms, preferably methyl groups.

Preferably, the aromatic ring has an electronegative substituent in a para position to the bridge carbon atom directly attached to the heteroatom (i.e., which is in an ortho position to the heteroatom of the heterocyclic ring). Non-limiting examples of useful electronegative substituents are hydroxyl groups and thiol groups. Preferably, the aromatic ring has no hydroxyl or thiol substituents in the other positions about the aromatic ring. However, the aromatic ring can include hydrogen or aliphatic substituents, such as alkyl substituents having about 1 to about 10 carbon atoms, in the other positions about the ring. Hydrogen or methyl substituents are preferred.

A structural formula representative of non-limiting examples of suitable terpene materials for use in the present invention is set forth in formula (XV) below:

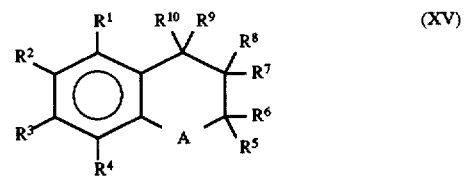

(XV)

In formula (XV), A is a heteroatom selected from the group consisting of oxygen, sulfur and phosphorus, and is preferably oxygen. $R^2$ is an electronegative substituent selected from hydroxyl groups and thiol groups, and is preferably a hydroxyl group. $R^1$, $R^3$ and $R^4$ are each independently selected from hydrogen or aliphatic groups, for example alkyl groups having about 1 to about 10 carbon atoms which can be saturated or unsaturated, branched or straight chain. $R^1$, R3 and R4 are preferably hydrogen or methyl groups.

$R^5$, $R^6$, $R^7$, $R^8$, $R^9$ and $R^{10}$ are each independently selected from hydrogen, aliphatic groups or alkenyl groups which can be branched or straight chain, substituted or unsubstituted. Suitable alkyl groups contain about 1 to about 50 carbon atoms, preferably about 1 to about 35 carbon atoms, and more preferably about 5 to about 25 carbon atoms. The alkyl or alkenyl group can include a terminal group such as a hydroxyl, thiol or aromatic group such as a benzyl group. The alkyl or alkenyl groups can be branched or straight chain, and include substituents such as alkyl groups having about 1 to about 3 carbon atoms, preferably methyl groups. Preferably $R^5$ or $R^6$ is a branched alkyl or alkenyl containing about 5 to about 25 carbon atoms.

Also included in the present invention are isomers of the above formula (XV).

Non-limiting examples of antioxidant vitamin materials useful in the present curable compositions include those antioxidant materials which are not terpene materials selected from vitamin A materials, vitamin B materials, vitamin C materials, vitamin D materials, vitamin E materials, vitamin K materials, provitamins, derivatives and mixtures thereof.

Non-limiting examples of antioxidant vitamin C materials useful in the present invention, which are not terpene materials, include ascorbic acid (vitamin C), ascorbyl palmitate, isomers thereof and derivatives thereof.

Ascorbic acid is generally in the form of white crystals, plates or needles and has a melting point of about 192° C. *Kirk-Othmer Vol.* 2 at pages 747–761, which are hereby incorporated by reference. The structure of ascorbic acid is shown in formula (XVI) below:

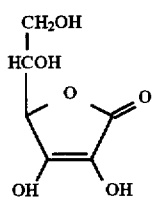 (XVI)

Ascorbic acid is soluble in water, slightly soluble in alcohol, and insoluble in oils and fats. *Hawley's* at page 99, which is hereby incorporated by reference. Ascorbic acid oxidizes on exposure to air and light. *Kirk-Othmer Vol.* 2 at page 750 and *Hawley's* at page 99. Ascorbic acid and ascorbyl palmitate are employed as antioxidants in foodstuffs.

Sources of ascorbic acid include food products, such as acerola, citrus fruits, tomatoes, potatoes and green leafy vegetables. *Hawley's* at page 99. Ascorbic acid can be synthesized by a variety of methods, such as by the Reichstein (L-sorbose) method or by using Acetobacter xylinum, as discussed in *Kirk-Othmer Vol.* 2 at pages 752–753 and by the methods disclosed in *Merck* 9th Ed. at page 111, which is hereby incorporated by reference. Ascorbic acid is commercially available from Aldrich Chemical Company of Milwaukee, Wis. and Hoffmann-LaRoche Inc.

Another example of a vitamin C material which is useful in the present invention is ascorbyl palmitate, which is a white or yellowish-white powder having a melting point of about 116°–117° C. *Hawley's* at page 99. Ascorbyl palmitate is soluble in alcohol, animal and vegetable oils and is slightly soluble in water. *Hawley's* at page 99. Ascorbyl palmitate is derived from palmitic and 1-ascorbic acids. *Hawley's* at page 99. Ascorbyl palmitate can be characterized as an antioxidant, stabilizer or emulsifier for use in fats and oils. *Hawley's* at page 99. Ascorbyl palmitate is commercially available from Hoffmann-LaRoche, Inc.

A vitamin K material which is not a terpene material yet which is believed to be useful in the present invention is menadione (vitamin $K_3$ or 2-methyl-1,4-naphthoquinone). *Hawley's* at page 737, which is hereby incorporated by reference. A yellow crystalline powder, menadione is nearly odorless, has a melting point of about 105°–107° C. and is affected by sunlight. *Hawley's* at page 737. Menadione is soluble in alcohol and vegetable oils, and insoluble in water. *Hawley's* at page 737.

The antioxidant generally comprises about 0.00001 weight percent (about 0.1 part per million (ppm)) to about 5 weight percent (about 50,000 ppm) based upon the weight of the substrate. The antioxidant can comprise about 0.0001 (about 1 ppm) to about 2 weight percent (about 20,000 ppm), and preferably comprises about 0.0001 to about 1 weight percent (about 10,000 ppm) based upon the weight of the substrate. The antioxidant can also comprise about 0.0001 weight percent to about 0.5 weight percent (about 5,000 ppm) based upon the weight of the substrate, preferably about 0.0001 weight percent to about 0.1 weight percent (about 1,000 ppm), and more preferably about 0.0001 weight percent to about 0.001 weight percent (about 10 ppm).

When the curable composition is applied to glass fibers, it is preferred that the antioxidant comprise about 0.0001 weight percent to about 0.1 weight percent (about 1,000 ppm), and more preferably about 0.0001 weight percent to about 0.001 weight percent (about 10 ppm) based upon the weight of the substrate.

Based upon the weight of the total solids of the curable composition, the antioxidant generally comprises about 0.0001 to about 100 weight percent of the curable composition. The antioxidant can comprise about 0.0001 to about 50 weight percent, and preferably about 0.001 to about 5 weight percent of the curable composition. Also, the antioxidant can comprise about 0.001 to about 1 weight percent and more preferably about 0.01 to about 0.1 weight percent of the curable composition.

The curable composition can also include one or more organic solvents for the antioxidant, such as alcohols and/or ketones. Suitable alcohols can be monohydric or polyhydric, and primary, secondary or tertiary alcohols. Non-limiting examples of useful alcohols include monohydric alcohols such as methanol, ethanol, isopropanol, butanol, propanol, pentanol, hexanol and cyclohexanol and polyhydric alcohols such as 1,2-ethanediol, 1,2-propanediol, 1,2,3-propanetriol and mixtures thereof.

Useful ketones preferably include hydroxyl groups. Examples of suitable ketones include acetone, methyl ethyl ketone, methyl isopropyl ketone, methyl isobutyl ketone, methyl ethyl butyl ketone, acetoin (3-hydroxy-2-butanone), ethylketol, diacetone alcohol (4-hydroxy-4-methylpentanone-2), propioin and mixtures thereof.

Generally, the solvent is less than about 20 weight percent of the curable composition on a total weight basis, and preferably less than about 10 weight percent. The solvent can be less than about 5 weight percent and more preferably is less than about 1 weight percent of the curable composition.

Water (preferably deionized) is preferably included in the curable composition in an amount sufficient to facilitate application of a generally uniform coating upon the substrate. The weight percentage of solids of such an aqueous curable composition can be about 0.001 to about 99.9 weight percent. Preferably, the weight percentage of solids is about 0.1 to about 50 weight percent and, more preferably, about 1 to about 20 weight percent.

When the curable composition is used as a sizing composition for glass fibers, the percentage of solids of such an aqueous curable composition can be about 0.01 to about 30 weight percent, is preferably about 0.1 to about 20 weight percent, and more preferably is about 0.1 to about 10 weight percent. As used herein, the terms "size" or "sizing" refer to the aqueous curable composition applied to glass fibers immediately after formation of the glass fibers.

The curable composition can further comprise one or more second antioxidant materials or synergists different from the antioxidant terpene material or antioxidant vitamin material. Non-limiting examples of useful second antioxidant materials include citric acid, butylated hydroxyanisole (BHA -commercially available from Sigma Chemical Co.), butylated hydroxytoluene (BHT - commercially available from Neville Island Chemical Company of Neville Island, Pittsburgh, Pa.) lecithin, tartaric acid, monoglyceride citrate, stearyl citrate, monoisopropyl citrate, hindered phenols, amines, propionates, sulfur-containing materials, quinones and phosphorus-containing materials.

Examples of useful propionates include Irganox™ 1010 (pentaerythrityl tetrakis(3,5-ditert-butyl-4-hydroxyphenyl propionate) and Irganox™ 1076 (stearyl beta-(3,5-ditert-butyl-4-hydroxy-phenyl)-propionate, which are commercially available from Ciba-Geigy Corp. of Greensboro, N.C.

Examples of useful secondary antioxidant sulfur-containing materials include Anoxsyn 442, which is a bis alkyl sulfide commercially available from Atochem N.A. of Philadelphia, Pa., and distearylthiodipropionate (DSTDP).

Non-limiting examples of phosphorus-containing antioxidant materials include phosphites such as sodium hypophosphite, Irganox™ B215 (67% tris(2,4-ditertbutylphenyl) phosphite and 33% pentaerythrityl tetrakis(3, 5-ditert-butyl-4-hydroxyphenyl propionate)), Irganox™ 168 (tris(2,4-ditert-butylphenyl)phosphite), which are commercially available from Ciba-Geigy Corp. and Ultranox 626 which is commercially available from GE Specialty Chemicals.

Non-limiting examples of phosphorus-containing synergistic secondary antioxidant materials include phosphites such as trisalkyl phosphites having long or branched alkyl groups, triaryl phosphites which can have alkyl substituents, such as tris(p-nonylphenyl) phosphite (TNPP), mixed aryl alkyl phosphites, such as bis-(2,4-di-t-butylphenyl)-pentaerythrityl disphosphite, tris-(2,4-di-t-butylphenyl)-pentaerythrityl disphosphite, distearyl pentaerythrityl disphosphite and 2,2'- methylene-bis (4,6-di-tert-butylphenyl) octylphosphite (commercially available as Mark HP-10 from Argus Chemical Co.), phosphates such as tetrakis(2, 4-di-t-butylphenyl)-4,4'- biphenyldiphosphate, phosphonates such as sodium benzene phosphonate, and fluorophosphonites such as 2,2'-ethylidene-bis (4,6-di-t-butylphenyl) fluorophosphonite (commercially available as Ethanox® 398 from Ethyl Corporation).

The curable composition of the present invention can further comprise one or more components which are different from the antioxidant. These components are preferably selected from film-forming materials, lubricants, coupling agents, crosslinkers, plasticizers, humectants, emulsifiers, ultraviolet light stabilizers, colorants, antistatic agents, waxes and combinations thereof.

In the alternative embodiment discussed above, the curable composition comprises an antioxidant selected from terpene materials, vitamin materials and combinations thereof in an amount effective to inhibit oxidation of the composition, as well as a film-forming material capable of forming a substantially uniform continuous coating on the substrate. The curable composition of the alternative embodiment can also include one or more of the components discussed above.

Non-limiting examples of suitable film-forming materials for use in the present invention include starches, cellulosic materials, thermoplastic materials, thermosetting materials and mixtures thereof.

Examples of useful starches include those derived from potatoes, corn, tapioca or rice. Such starches may have high or low amylose contents, and can be modified by acetylation, chlorination, acid hydrolysis, derivatizing agents, crosslinking agents or enzymatic action, for example. Non-limiting examples of useful starches include Kollotex 1250 (low amylose potato-based chemically modified starch which is commercially available from AVEBE of the Netherlands), National 1554 (low amylose crosslinked potato starch), Hylon and Nabond high amylose starches (which are commercially available from National Starch and Chemical Corp. of Bridgewater, N.J.).

Examples of the thermoplastic and thermosetting film-forming materials include thermoplastic or thermosetting acrylic polymers, aminoplasts, alkyds, polyepoxides, phenolics, polyamides, polyolefins, polyesters, polyurethanes, vinyl polymers, derivatives and mixtures thereof, to name a few.

Acrylic polymers useful in the present invention include polymers or copolymers of monomers such as acrylic acid; methacrylic acid; esters of these acids such as acrylates, methacrylates, ethylacrylate, propylacrylate and butylacrylate; polyglycidyl acrylates and methacrylates; acrylamides and acrylonitriles.

Non-limiting examples of commercially available acrylic polymers include Fulatex materials which are commercially available from H. B. Fuller Co. of St. Paul, Minn.; Rhoplex E-693 and Rhoplex TR-407 acrylic emulsions which are commercially available from Rohm and Haas of Philadelphia, Pa.; and Carboset acrylic polymers which are commercially available from B.F. Goodrich Co. of Toledo, Ohio.

Suitable acrylic polymers also include copolymers with unsaturated vinyl compounds such as styrene or vinyl acetate (such as Vinol products which are commercially available from Air Products and Chemicals, Inc. of Allentown, Pa.) Other useful acrylic copolymers are n-methylolacrylamide vinyl acetate copolymers such as are included in Resyn® 2828, an emulsion which is commercially available from National Starch and Chemical Co. of Bridgewater, N.J.

Useful aminoplasts include urea-formaldehyde and melamine formaldehyde such as Resimene 841 which is commercially available from Monsanto Co. of St. Louis, Mo.

Useful epoxides contain at least one epoxy or oxirane group in the molecule, such as polyglycidyl ethers of polyhydric alcohols or thiols. Useful polyglycidyl ethers of polyhydric alcohols can be formed by reacting epihalohydrins and/or butadiene dioxide with polyhydric alcohols, such as dihydric alcohols, in the presence of an alkali condensation and dehydrohalogenation catalyst such as sodium hydroxide or potassium hydroxide. Useful epihalohydrins include epibromohydrin, dichlorohydrin and epichlorohydrin, which is believed to be preferred. Suitable polyhydric alcohols can be aromatic, aliphatic or cycloaliphatic.

Non-limiting examples of aromatic polyhydric alcohols include phenols which are preferably at least dihydric phenols. Non-limiting examples of aromatic polyhydric alcohols useful in the present invention include dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)-1,1-ethane; bis hydroxyphenyl)methane; 1,5-hydroxynaphthalene; 4-isopropylidene bis (2,6-dibromophenol); 1,1,2,2-tetra(p-hydroxy phenyl)-ethane; 1,1,3-tris(p-hydroxy phenyl)-propane; novolac resins; bisphenol F; long-chain bisphenols; and 4,4'-isopropylidenediphenol, i.e., bisphenol A. Bisphenol A is believed to be a preferred polyhydric alcohol.

Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2, 6-hexanetriol, erythritol and trimethylolpropane; and mixtures thereof.

An example of a suitable cycloaliphatic alcohol is cyclohexanedimethanol.

Examples of suitable commercially available epoxy film-forming polymers are EPON® 826 and 828 epoxy resins, which are epoxy functional polyglycidyl ethers of bisphenol A prepared from bisphenol-A and epichlorohydrin and are commercially available from Shell Chemical. Other examples of useful epoxy film-forming polymers are set forth in U.S. Pat. No. 4,752,527 of Sanzero et al., which is hereby incorporated by reference.

Aqueous emulsions or dispersions of the epoxy and hydroxy functional polyglycidyl ethers described above can be prepared with the aid of surfactants and emulsifiers to form emulsions or dispersions. Examples of such emulsions include EPI-REZ® CMD 35201, which is commercially available from Shell Chemical Co. of Houston, Tex. and Araldite® XU GY 281 which is commercially available from Ciba-Geigy Corp.

An example of a suitable non-ionic thermosetting urethane-modified epoxy polymer is the emulsion EPI-REZ® CMD 5520-W-60 which is commercially available from Shell Chemical Co. This material is a non-ionic, aqueous dispersion of a thermosetting urethane-modified epoxy resin which has a weight per epoxide of about 480–560 (determined by Shell Test Method HC-427D-89) and about 60 weight percent solids. See "Shell Resins EPI-REZ® CMD 5520-W-60 Waterborne Resin", Technical Bulletin of Shell Chemical Company (April 1994).

A non-limiting example of a phenolic suitable for use in the present invention is phenol formaldehyde.

Useful polyamides include the Versamid products which are commercially available from General Mills Chemicals, Inc.

Non-limiting examples of useful polyolefins include polypropylene and polyethylene materials such as the polypropylene emulsions RL-5440, which is commercially available from Sybron Chemicals of Birmingham, N.J., and Polyemulsion Chemcor 43C30, which is commercially available from Chemical Corp. of America. Another example of a suitable polyolefin for use in the present invention is the high density polyethylene emulsion Protolube HD which is commercially available from Sybron Chemicals of Birmingham, N.J.

Non-limiting examples of useful polyester materials include RD-847A polyester resin which is commercially available from Borden Chemicals of Columbus, Ohio. Other suitable polyesters are Stypol polyesters which are commercially available from Cook Composites and Polymers of Port Washington, Wis. and Neoxil polyesters which are commercially available from Savid S.p.A. of Como, Italy.

Thermoplastic polyesters useful in the present invention include ethylene adipates (such as Desmophen 2000) and ethylene butylene adipates (such as Desmophen 2001KS), both of which are commercially available from Bayer of Pittsburgh, Pa.

Suitable thermoplastic polyurethanes are condensation products of a polyisocyanate material and a hydroxyl-containing material such as polyol and include, for example, Witcobond® W-290H which is commercially available from Witco Chemical Corp. of Chicago, Ill. and Ruco 2011L which is commercially available from Ruco Polymer Corp. of Hicksville, N.Y. Suitable thermosetting polyurethanes include Baybond XW-11, which is commercially available from Bayer and other thermosetting polyurethanes which are commercially available from Bayer and E.I. duPont de Nemours Co. of Wilmington, Del.

Non-limiting examples of useful vinyl polymers include Resyn 2828 and Resyn 1037 vinyl acetate copolymer emulsions which are commercially available from National Starch, and other polyvinyl acetates such as are commercially available from H. B. Fuller and Air Products and Chemicals Co. of Allentown, Pa. Other useful vinyl polymers include polyvinyl pyrrolidones such as PVP K-15, PVP K-30, PVP K-60 and PVP K-90, each of which are commercially available from ISP Chemicals of Wayne, N.J.

Other film-forming materials suitable for use in the curable composition include silicon-based materials such as silicones and siloxanes.

The amount of film-forming material can be about 0.0001 to about 99.9 weight percent of the curable composition on a total solids basis, preferably about 0.01 to about 50 weight percent, and more preferably about 0.1 to about 10 weight percent.

Useful lubricants include cationic, non-ionic or anionic lubricants and mixtures thereof. The amount of lubricant can be about 0.0001 to about 99.9 weight percent of the curable composition on a total solids basis, preferably about 0.01 to about 50 weight percent, and more preferably about 0.1 to about 10 weight percent.

Non-limiting examples of such lubricants are glass fiber lubricants which include amine salts of fatty acids (which can, for example, include a fatty acid moiety having 12 to 22 carbon atoms and/or tertiary amines having alkyl groups of 1 to 22 atoms attached to the nitrogen atom ), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), acid solubilized polyunsaturated fatty acid amides, condensates of a fatty acid and polyethylene imine and amide substituted polyethylene imines, such as Emery 6717, a partially amidated polyethylene imine commercially available from Henkel Corporation of Kankakee, Ill.

A useful alkyl imidazoline derivative is Cation X, which is commercially available from Rhone Poulenc of Princeton, N. J. Other useful lubricants include RD-1135B epoxidized polyester which is commercially available from Borden Chemical of Louisville, Ky., Cirrasol 185A fatty acid amide, and Ketjenlube 522 partially carboxylated polyester which is commercially available from Akzo Chemicals, Inc. Of Chicago, Ill.

The curable compositions can further include one or more functional organo silane, organo titanate and/or organo zirconate coupling agents. Such functional organo silane coupling agents typically have dual functionality. Each metal or silicon atom has attached to it one or more hydrolyzable groups which can react with the substrate surface to remove hydroxyl groups and one or more groups which can react other components in the curable composition, such as the film-forming material, to form a chemical bridge between the substrate or glass surface and the material. Examples of hydrolyzable groups include:

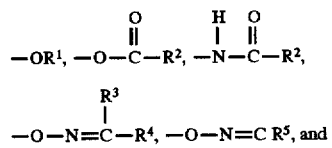

the monohydroxy and/or cyclic $C_2$–$C_3$ residue of a 1,2- or 1,3 glycol, wherein $R^1$, is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of groups reactive with film-forming materials include epoxy, glycidoxy, mercapto, cyano, allyl, urethano, halo, isocyanato, ureido, imidazolinyl, vinyl, acrylato, methacrylato, amino or polyamino groups.

Examples of such functional organo silane coupling agents include 3-aminopropyldimethylethoxysilane, gamma-aminopropyltriethoxysilane, gamma-aminopropyltrimethoxy-silane, beta-aminoethyltriethoxysilane, N-beta-aminoethyl-aminopropyltrimethoxysilane, gamma-isocyanatopropyltriethoxy-silane, vinyl-trimethoxysilane, vinyl-triethoxysilane, allyl-trimethoxysilane, mercaptopropyltrimethoxysilane, mercaptopropyltriethoxysilane, glycidoxypropyltriethoxysilane, glycidoxypropyltrimethoxysilane, 4,5-epoxycyclohexylethyltrimethoxysilane, ureidopropyltrimethoxysilane, ureidopropyltriethoxysilane, chloropropyltrimethoxysilane, and chloropropyltriethoxysilane.

Non-limiting examples of useful functional organo silane coupling agents include epoxy (A-187 gamma-glycidoxypropyltrimethoxysilane), methacrylate (A-174 gamma-methacryloxypropyltrimethoxysilane) and amino (A-1100 gamma-aminopropyl-triethoxysilane) silane coupling agents, each of which are commercially available from OSi Specialties, Inc. of Danbury, Conn. Other examples of useful silane coupling agents are set forth in K. Loewenstein, *The Manufacturing Technology of Continuous Glass Fibres* at page 263 (2d Ed. New York 1983), which is hereby incorporated by reference.

The amount of functional organo silane coupling agent can be about 0.0001 to about 99.9 weight percent of the curable composition on a total solids basis, and is preferably about 0.01 to about 50 weight percent and more preferably about 0.1 to about 15 weight percent.

Non-limiting examples of suitable crosslinkers which can be used when the film-forming material is thermosetting include melamine formaldehyde, blocked isocyanates such as Baybond XW 116 or XP 7055, epoxy crosslinkers such as Witcobond XW by Witco Corp., and polyesters such as Baybond XP-7044 or 7056. The Baybond products are commercially available from Bayer of Pittsburgh, Pa. The amount of crosslinker can be about 0.0001 to about 99.9 weight percent of the curable composition on a total solids basis, preferably about 0.01 to about 50 weight percent, and more preferably about 0.1 to about 10 weight percent.

The curable compositions can also include one or more aqueous dispersible or soluble plasticizers. Examples of suitable non-aqueous-based plasticizers which are aqueous dispersible include phthalates, such as di-n-butyl phthalate; trimellitates, such as trioctyl trimellitate; and adipates, such as dioctyl adipate. An example of an aqueous soluble plasticizer is Carbowax 400, a polyethylene glycol which is commercially available from Union Carbide of Danbury, Conn. The amount of plasticizer can be about 0.01 to about 20 weight percent of the curable composition on a total solids basis, and is more preferably about 0.1 to about 10 weight percent.

Examples of useful humectants include glycerols such as are commercially available from Sigma Chemical and Dow Chemical USA of Midland, Mich. The amount of humectant can be about 0.01 to about 20 weight percent of the curable composition on a total solids basis, and is more preferably about 0.1 to about 10 weight percent.

Non-limiting examples of suitable emulsifying agents or surfactants include polyoxyalkylene block copolymers, ethoxylated alkyl phenols, polyoxyethylene octylphenyl glycol ethers, ethylene oxide derivatives of sorbitol esters and polyoxyethylated vegetable oils.

An example of a suitable polyoxypropylene-polyoxyethylene copolymer is the material PLURONIC™ F-108, which is commercially available from BASF Corporation of Parsippany, N.J. This material is a condensate of ethylene oxide with hydrophobic bases formed by condensation of propylene oxide with propylene glycol.

Examples of useful ethoxylated alkyl phenols include ethoxylated octylphenoxyethanol, phenoxy polyethyleneoxy(ethanol), phenoxy(ethyleneoxy)ethanol and nonyl phenoxy poly(ethyleneoxy)ethanol. An example of a commercially available ethoxylated octylphenoxyethanols are IGEPAL CA-630 from GAF Corporation of Wayne, N.J.

An example of a polyoxyethylated vegetable oil is EMULPHOR EL-719, which is commercially available from GAF Corp. A useful polyoxyethylene octylphenyl glycol ether is Triton X-100, which is commercially available from Rohm & Haas of Philadelphia, Pa. Tween 21 and 81 are examples of useful ethylene oxide derivatives of sorbitol esters.

Other examples of suitable emulsifying agents include non-ionic epoxide polyols such as NOVEPOX™ or Prox E 117, which are commercially available from Synthron, Inc.

Generally, the amount of emulsifying agent can be about 0.01 to about 20 weight percent of the curable composition on a total solids basis, and is more preferably about 0.1 to about 10 weight percent.

Examples of ultraviolet light stabilizers useful in the present invention include hindered-amine light stabilizers (HALS) such as are available from Atochem. The amount of ultraviolet light stabilizer can be about $1\times10^{-4}$ to about 10 weight percent of the total solids of the curable composition, and more preferably about 0.001 to about 1 weight percent.

Useful colorants or pigments include Ultramarine Blue which is commercially available from Whittaker Chemical, nigrosine and cadmium-based, iron oxide-based chromium compounds, for example. The amount of colorant on a total solids basis can be about $1\times10^{-4}$ to about 10 weight percent, and more preferably about 0.001 to about 5 weight percent.

Examples of antistatic agents useful in the present invention include Larostat 264 alkyl dipolyoxyethylene ethyl ammonium ethyl sulfate which is commercially available from Jordan Chemical Co. of Folcroft, Pa. The amount of antistatic agent can be about $1\times10^{-4}$ to about 10 weight percent, and more preferably about 0.001 to about 5 weight percent of the curable composition on a total solids basis.

The curable compositions can also include one or more aqueous soluble, emulsifiable or dispersible waxes. The wax can be selected from vegetable, animal, mineral, synthetic or petroleum waxes, for example. Preferably, the wax has a high degree of crystallinity and is obtained from a paraffinic source, such as a microcrystalline wax. Other useful microcrystalline waxes are commercially available from Petrolite Corp. of Tulsa, Okla. and Michelman, Inc. of Cincinnati, Ohio. The amount of wax can be about $1\times10^{-4}$ to about 5 weight percent of the curable composition on a total solids basis.

Fungicides, bactericides and anti-foaming materials can also be included in the curable compositions. Examples of suitable bactericides include potassium cyanide and Biomet 66 antimicrobial compound, which is commercially available from M & T Chemicals of Rahway, N. J. Suitable anti-foaming materials are the SAG materials which are commercially available from OSi Specialties, Inc. of Danbury, Conn. The amount of fungicide or bactericide can be about $1\times10^{-4}$ to about 5 weight percent of the curable composition on a total solids basis.

The curable compositions can further comprise one or more organic acids in an amount sufficient to provide the aqueous sizing composition with a pH of about 3 to about 7, preferably about 3.5 to about 5.5. Non-limiting examples of organic acids suitable for use in the present invention include mono-and polycarboxylic acids and/or anhydrides thereof, such as acetic, citric, formic, propionic, caproic, lactic, benzoic, pyruvic, oxalic, maleic, fumaric, acrylic, methacrylic acids and mixtures thereof.

One or more of the components discussed above can have functionality adapted to react with the antioxidant. For example, a film-forming material such as GP-2925 which is commercially available from Georgia-Pacific is an epoxidized polyamide have functionality which can be reacted with the hydroxyl group of an antioxidant of the curable composition of the present invention, such as alpha-tocopherol.

Another non-limiting example of such a functional film-forming material is XP-7055, which is commercially available from Bayer, which includes blocked isocyanate moieties capable of reacting with the hydroxyl group of an antioxidant of the curable composition of the present invention.

Similarly, a lubricant such as Emery 6717, a partially amidated polyethylene imine, can be reacted with an epichlorohydrin material to provide epoxy functionality to the lubricant. The epoxy functional lubricant can be reacted with an antioxidant of the curable composition of the present invention, such as alpha-tocopherol or ascorbyl palmitate.

An electrophilic epoxy functional organo silane coupling agent such as A-187, or a nucleophilic amino functional organo silane coupling agent such as A-1100 reacted with epichlorohydrin, can also be reacted with an antioxidant of the curable composition of the present invention.

Other suitable means for reacting the antioxidant with one or more of the components discussed above, in view of the present disclosure, is within the knowledge of one of ordinary skill in the art.

The curable compositions of the present invention can be prepared by any suitable method well known to those of ordinary skill in the art. Preferably, the antioxidant is dissolved in the solvent or reacted with a selected other component before being mixed with the other components of the curable composition. The curable compositions of the present invention are preferably mixed with low to moderate shear for about 1 hour prior to application to the substrate.

The antioxidant curable compositions of the present invention are applied to at least a portion of the surface of the substrate in an amount effective to inhibit oxidation of the composition and any materials which the coated substrate contacts.

The antioxidant curable compositions of the present invention are adapted to coat a substrate. The substrate can be any organic material or inorganic material. Preferably, the substrate is selected from inorganic materials, natural materials, thermoplastic materials and thermosetting materials. The substrate can be in the form of fibers, plates, sheets, fabrics, rods, tubes, powders, beads, flakes and hollow spheres.

Inorganic materials suitable for use in the present invention include ceramics and minerals. Non-limiting examples of useful ceramics include glass, silicon carbide, silicates such as talc or aluminum silicates (for example, mica, alumina, kaolin or clays), diatomite, aluminum oxide, and silicon carbide. Examples of suitable minerals include zinc oxide, mineral wool, magnesium oxide, calcium carbonate; magnesium carbonate, calcium sulfate, wollastonite and basalt. Boron fibers are also useful as substrates in the present invention.

Glass fibers are the preferred substrate for use in the present invention. The curable compositions of the present invention can be applied to any type of fiberizable glass composition known to those of ordinary skill in the art. Glass fibers suitable for use in the present invention include those prepared from fiberizable glass compositions such as "E- glass", "621-glass", "A-glass", "C-glass", "S-glass", "ECR-glass" (corrosion resistant glass) and fluorine and/or boron-free derivatives thereof. Such compositions are well known to those skilled in the art and are disclosed in Loewenstein at pages 33–45, which is hereby incorporated by reference.

Natural materials useful as substrates in the present invention include, for example, cotton, cellulose, natural rubber and wool.

Substrates useful in the present invention can include those formed from thermoplastic materials and thermoplastic elastomeric materials such as polyolefins, polyamides, thermoplastic polyurethanes, thermoplastic polyesters, acrylic polymers, vinyl polymers, copolymers, derivatives and mixtures thereof.

Non-limiting examples of useful polyolefins include polyethylene, extended-chain polyethylene, polypropylene, polybutene, polyisoprene, and polypentene, polymethyl pentene, polytetrafluoroethylene and neoprene.

Useful polyamides include nylons such as nylon 6 (a polymer of caprolactam), nylon 12 (which can be made from butadiene), nylon 66 (a condensation product of adipic acid and hexamethylenediamine), nylon 10 and nylon 12. Useful nylons are commercially available from E.I. duPont de Nemours and Company of Wilmington, Del. Other examples of useful polyamides include polyhexamethylene adipamide and aramids such as Kevlar™, which is commercially available from DuPont.

Suitable thermoplastic polyurethanes are condensation products of a polyisocyanate material and a hydroxyl-containing material such as polyol and include, for example, Estane and Texin polyurethanes which are commercially available from B.F.Goodrich and Bayer, respectively.

Thermoplastic polyesters useful in the present invention include polyethylene terephthalate and polybutylene terephthalate.

Acrylic polymers useful in the present invention include polyacrylates, polyacrylamides and polyacrylonitriles such as nitrile rubber and Orlon™, a copolymer which contains at least 85% acrylonitrile.

Useful vinyl polymers include polyvinyl chloride, polyvinylidene chloride (saran), polyvinyl fluoride, polyvinylidene fluoride, ethylene vinyl acetate copolymers, such as Elvax which is commercially available from duPont, and polystyrenes such as Dylark which is a maleic anhydride-modified styrene which is commercially available from Arco Chemical of Newtown Square, Pa.

Thermoplastic elastomeric materials useful as substrates in the present invention include styrene-butadiene rubbers, styrene-acrylonitrile (SAN) copolymers such as Lustran, which is commercially available from Monsanto of St. Louis, Mo., styrene-butadiene-styrene (SBS) copolymers and acrylonitrile-butadiene-styrene (ABS) copolymers, such as Cycolac or Blendex, which are commercially available from GE Plastics of Pittsfield, Mass.

Further examples of useful thermoplastic materials include polyimides including polyethylene imides such as Ultem, which is commercially available from GE Plastics; polyether sulfones, such as Victrex which is commercially available from ICI Americas, Inc. of Wilmington, Del.; polyphenyl sulfones such as Radel R which is believed to be commercially available from Amoco; polyetherketones including polyetheretherketones (PEEK) such as Ultra Pec, which is commercially available from BASF Corp. of Parsippany, N.J.; polyphenylene oxides such as Noryl, which is commercially available from G.E. Plastics; polyphenylene sulfides such as Ryton R which is commercially available from Phillips Chemical Co. of Houston, Tex.; polyacetals such as Celcon, which is commercially available from Hoechst Celanese Corp. of Chatham, N.J.; polyvinyl chlorides; and polycarbonates such as Lexan, which is commercially available from G.E. Plastics, and Makrolon, which is commercially available from Bayer. Also included as suitable thermoplastic materials are any of the above thermoplastics which are modified by an unsaturated monomer.

Substrates useful in the present invention can include those formed from thermosetting materials such as thermosetting polyesters, vinyl esters, epoxides, phenolics, aminoplasts, thermosetting polyurethanes, derivatives and mixtures thereof.

Suitable thermosetting polyesters include the AROPOL products which are commercially available from Ashland Chemical Inc. of Columbus, Ohio. Examples of useful vinyl esters include Derakane® products such as Derakane® 470-45, which are commercially available from Dow Chemical USA of Midland, Mich.

Useful epoxides contain at least one epoxy or oxirane group in the molecule, such as polyglycidyl ethers of polyhydric alcohols or thiols. Useful polyglycidyl ethers of polyhydric alcohols can be formed by reacting epihalohydrins and/or butadiene dioxide with polyhydric alcohols, such as dihydric alcohols, in the presence of an alkali condensation and dehydrohalogenation catalyst such as sodium hydroxide or potassium hydroxide. Useful epihalohydrins include epibromohydrin, dichlorohydrin and epichlorohydrin, which is believed to be preferred. Suitable polyhydric alcohols can be aromatic, aliphatic or cycloaliphatic. Non-limiting examples of aromatic polyhydric alcohols include phenols which are preferably at least dihydric phenols. Non-limiting examples of aromatic polyhydric alcohols useful in the present invention include dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)-1,1-ethane; bis(2-hydroxyphenyl)methane; 1,5-hydroxynaphthalene; 4-isopropylidene bis(2,6-dibromophenol); 1,2,2-tetra(p-hydroxy phenyl)-ethane; 1,1,3-tris(p-hydroxy phenyl)-propane; novolac resins; bisphenol F; long-chain bisphenols; and 4,4'-isopropylidenediphenol, i.e., bisphenol A. Bisphenol A is believed to be a preferred polyhydric alcohol.

Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2,6-hexanetriol, erythritol and trimethylolpropane; and mixtures thereof. An example of a suitable cycloaliphatic alcohol is cyclohexanedimethanol.

Examples of suitable commercially available epoxides are EPON® 826 and 828 epoxy resins, which are epoxy functional polyglycidyl ethers of bisphenol A prepared from bisphenol-A and epichlorohydrin and are commercially available from Shell Chemical. Other examples of useful epoxy film-forming polymers are set forth in U.S. Pat. No. 4,752,527 of Sanzero et al., which is hereby incorporated by reference.

Non-limiting examples of suitable phenolics include phenol-formaldehydes such as Resorciphen 2074-A which is commercially available from Indspec Chemical Corp. of Pittsburgh, Pa. Useful aminoplasts include urea-formaldehyde and melamine formaldehyde such as Resimene 841 which is commercially available from Monsanto Co. of St. Louis, Miss. Suitable thermosetting polyurethanes include Baybond XW-110, which is commercially available from Bayer. Spandex polyurethanes, which are commercially available from Uniroyal Chemical of Danbury, Conn. and other thermosetting polyurethanes which are commercially available from Bayer and E.I. duPont de Nemours Co. of Wilmington, Del.

The curable composition can be applied to the substrate in a variety of ways. For example, the curable composition can be applied by dipping the substrate in a bath containing the composition, by spraying the composition upon the substrate or by contacting the substrate with an applicator such as a roller or belt applicator. The method and apparatus for applying the curable composition to the substrate is determined in part by the configuration and type of substrate material. In the preferred embodiment, in which the curable composition is applied to a plurality of glass fibers as an aqueous sizing composition, the composition can be applied by a belt or roller applicator. Non-limiting examples of such applicators and other suitable applicators are disclosed in *Loewenstein* at pages 169–177, which is hereby incorporated by reference.

The amount of the curable composition applied to the substrate can vary based upon such factors as the type of substrate and intended use of the substrate, i.e., the environment in which the substrate is to be placed and the nature of the contacting materials. For a plurality of glass fibers, the amount of curable composition in the form of an aqueous sizing composition having about $1\times10^{-4}$ to about 99.9 weight percent solids applied to the fibers can be about 0.1 to about 50 weight percent of the total weight of the glass fibers including the curable composition, and preferably, about 0.1 to about 20 weight percent.

After the curable composition is applied to the substrate, the substrate can be dried in an oven or air dried, if desired. Suitable ovens for drying substrates are well known to those of ordinary skill in the art. Drying of glass fiber forming packages or cakes is discussed in detail in *Loewenstein* at pages 224–230, which is hereby incorporated by reference. For example, the forming package can be dried in an oven at a temperature of about 220° F. to about 300° F. for about 10 to about 13 hours to produce glass fiber strands having a dried residue of the curable composition thereon.

The temperature and time for drying the substrate will depend upon such variables as the percentage of solids in the curable composition, components of the curable composition, type of substrate and, where the substrate is glass fiber, the type of glass fiber.

For a strand comprising a plurality of glass fibers, the dried residue of the curable composition (which can include other components in addition to the antioxidant) can be about 0.01 to about 20 weight percent of the total weight of the glass strand including the curable composition. Preferably, the dried residue of the curable composition is about 0.1 to about 10 weight percent of the total weight.

The substrate having the dried curable composition applied thereto can have applied thereon a secondary treatment or coating composition. For glass fiber strands to be used in the weaving process, a warp sizing composition can be applied to the sized glass fiber. Such warp sizing compositions typically include components such as polyvinyl alcohol and are well known to those skilled in the art. The glass fiber strands can be twisted and included, for example, as a warp strand 10 and/or weft strand 12 of a woven fabric 14, as shown in FIG. 1.

The secondary treatment or coating composition can also comprise an impregnating composition such as are disclosed in Loewenstein at page 253, which is hereby incorporated by reference, and U.S. Pat. Nos. 4,762,750 and 4,762,751, which are hereby incorporated by reference.

Alternatively, substrates having a primary coating thereon (which can be present as a dried residue), such as a conventional sizing composition, can have applied thereto by any of the methods discussed above a secondary treatment or coating comprising a curable composition of the present invention. Such sizing compositions can include as components film-formers such as starch and/or thermoplastic or thermosetting polymeric film-formers and mixtures thereof, lubricants such as animal, vegetable or mineral oils or waxes, coupling agents, emulsifiers, anti-oxidants, ultraviolet light stabilizers, colorants, antistatic agents and water, to name a few. Examples of suitable sizing compositions are set forth in *Loewenstein* at pages 243–295 and U.S. Pat. Nos. 4,271,299, 4,394,418 and 4,615,946, each of which is hereby incorporated by reference.

The glass fiber strands can be further processed by twisting into a yarn, chopping, combination in parallel to form a bundle or roving, weaving into a cloth or forming into a chopped or continuous strand mat, as discussed above. The coated strands can be used in a wide variety of applications, such as overwrap reinforcements for optical fiber cables and cloth for printed circuit boards, for example.

The present invention also includes methods for inhibiting the oxidation of a curable composition adapted to coat a substrate, the methods comprising (a) applying to the substrate one of the curable compositions in an amount effective to inhibit oxidation of the composition; and (b) drying the curable composition to form a substantially uniform coating upon the substrate. Suitable apparatus and methods for applying and drying the curable composition are discussed at length above and further discussion thereof is not believed to be necessary.

The present invention will now be illustrated by the following specific, non-limiting example.

EXAMPLE 1

Each of the components in the amounts set forth in Table 1 were mixed to form aqueous sizing compositions. The aqueous sizing composition of Sample 1 included 0.1172 weight percent DF-120 on a total solids basis. Ronotec DF-120 is a proprietary alpha-tocopherol-containing composition which includes about 20% of the Ronotec® 201 composition. Ronotec® 201 is a yellowish to brownish viscous oil having at least 92% dl- α-tocopherol which is commercially available from Hoffmann-LaRoche Inc. for technical purposes as antioxidants in polymers and oils.

The aqueous sizing composition of Sample 2 included 0.0586 weight percent DF-120 on a total solids basis. Samples 1 and 2 include alpha-tocopherol as an antioxidant in accordance with the present invention.

TABLE 1

| COMPONENT | WEIGHT OF COMPONENT IN GRAMS SAMPLE NO. | | |
|---|---|---|---|
|  | CONTROL | 1 | 2 |
| Witco W-290H polyurethane[1] | 82.80 | 82.80 | 82.80 |
| CMD W60-5520[2] | 227 | 227 | 227 |
| RD-1135B[3] | 11.80 | 11.80 | 11.80 |
| A-1100 silane[4] | 29.6 | 29.6 | 29.6 |
| A-1108 silane[5] | 29.6 | 29.6 | 29.6 |
| A-1120 silane[6] | 29.6 | 29.6 | 29.6 |
| Isopropanol | — | 4 | 4 |
| Ronotec DF-120[7] | — | 0.3 | 0.15 |
| water | 250 | 250 | 250 |

[1]Witco W-290H is a thermoplastic polyurethane which is commercially available from Witco Inc. of Chicago, Illinois.
[2]CMD W60-5520 is an aqueous emulsion of a non-ionic thermosetting urethane-modified epoxy copolymer commercially available from Rhone Poulenc Inc. of Collegeville, Pennsylvania. This material is currently commercially available from Shell Chemical Company of Houston, Texas.
[3]RD-1135B is a epoxidized polyester which is commercially available TABLE 1-continued from Borden Chemical Company of Louisville, Kentucky.
[4]A-1100 is a gamma-aminopropyltriethoxysilane which is commercially available from OSi Specialties, Inc. of Danbury, Connecticut.
[5]A-1108 is an amino silane which is commercially available from OSi Specialties, Inc.
[6]A-1120 is a N-(2-aminoethyl)-3-aminopropyltrimethoxysilane which is commercially available from OSi Specialties, Inc.
[7]Ronotec DF-120 is a proprietary alpha-tocopherol-containing composition which includes about 20% of the Ronotec ® 201 composition. Ronotec ® 201 is a yellowish to brownish viscous oil having at least 92% dl-α-tocopherol which is commercially available from Hoffmann-LaRoche for technical purposes as antioxidants in polymers and oils. Ronotec ® 201 Product Data Sheet May 1990 of Hoffman-LaRoche.

Each sizing composition was applied in a conventional forming process to K filament E-glass fibers to form a glass fiber strand. The strands were direct chopped into about 1/8th inch lengths. Physical properties for the sizing composition and resulting coated glass fiber strand for the Control and Samples 1–2 are also set forth in Table 2.

TABLE 2

|  | CONTROL | 1 | 2 |
|---|---|---|---|
| Total solids (grams) | 256.56528 | 256.56528 | 256.56528 |
| Total solids (%) | 6.73753 | 6.73753 | 6.73753 |
| Percentage of DF-120 in sizing composition | — | 0.1172 | 0.0586 |
| Percentage of DF-120 on glass | — | 0.000959 | 0.000509 |
| Moisture (%) | 13.44 | 13.16 | 14.35 |
| Wet Loss on Ignition (%) | 0.81 | 0.82 | 0.87 |
| Yardage[1] | 314 | 308 | 300 |

[1]Yardage is yards of glass fiber strand per pound of strand.

The thermal stability of the Control and Samples 1–2 were evaluated by testing tensile specimens of extrusion compounded and injection molded composites of the above coated glass strands at a 30% glass content in Celanex 2002 polybutylene terephthalate resin matrix material. The compounded materials were injection molded to prepare test specimens of the control and each sample. Each test specimen was prepared according to ASTM Method D-638.

Eight specimens each of the control and Samples 1 and 2 were evaluated for tensile strength and tensile elongation according to ASTM Method D-638. The remaining specimens were heated in a conventional high velocity air circulating oven to a temperature of about 185° C. for a total of eight (8) weeks.

Each week, 8 specimens each of the control and Samples 1 and 2 were removed from the oven. Each of the test specimens removed from the oven was cooled to about 25° C. Eight specimens each of the control and Samples 1 and 2 were evaluated for tensile strength in pounds per square inch (psi) using an Instron Model 1125 tensile testing machine at a 1000 pound load at 0.2 inches/minute. Concurrently, the specimens of the control and Samples 1 and 2 were evaluated for percent tensile elongation. The tests for tensile strength and elongation were conducted according to ASTM Method D-638.

The average values of tensile strength for each set of 8 test specimens are set forth in Table 3 below.

TABLE 3

AVERAGE TENSILE STRENGTH

| WEEKS AGING AT 185° C. | CONTROL (psi) | SAMPLE 1 | | SAMPLE 2 | |
|---|---|---|---|---|---|
| | | (psi) | DIFFERENCE FROM CONTROL (%) | (psi) | DIFFERENCE FROM CONTROL (%) |
| 0 | 18,390 | 18,200 | — | 17,980 | — |
| 1 | 17,690 | 18,090 | +2.26 | 19,580 | +10.68 |
| 2 | 13,240 | 13,460 | +1.66 | 15,440 | +16.62 |
| 3 | 9,815 | 9,930 | +1.68 | 11,900 | +21.24 |
| 4 | 8,801 | 8,865 | +0.7 | 9,881 | +12.27 |
| 5 | 7,557 | 7,449 | −1.4 | 8,742 | +9.1 |
| 6 | 7,279 | 7,264 | −0.2 | 7,774 | +6.8 |
| 7 | 6,490 | 5,882 | −9.4 | 6,652 | +2.3 |
| 8 | 6,090 | 6,222 | +2.2 | 6,387 | +4.9 |

Sample 1 includes 0.000959% DF-120 on the dried glass based upon the weight of the glass fiber. Sample 2 includes 0.000509% DF-120 on the dried glass fiber, based upon weight of the glass fiber, i.e., about half of the amount of DF-120 in the dried sizing composition applied to Sample 1. The control does not contain an antioxidant according to the present invention.

As shown in Table 3, the average tensile strength values for Sample 1 are about 2% higher than the Control for weeks 1 through 3. For weeks 4 through 7, the average tensile th values are slightly lower than those of the control. Unexpectedly, the average tensile strength of Sample 1 after 8 weeks aging at 185° C. is +2.2% higher than the average tensile strength for the Control.

All of the average tensile strength values for Sample 2 are significantly higher than the average tensile strength values for the Control. For example, for the first four weeks of aging at 185° C., the average tensile strength values for Sample 2 are more than 10% higher than the average tensile strength values for the Control. Unexpectedly, the average tensile strength of Sample 1 after 8 weeks aging at 185° C. is +2.2% higher than the average tensile strength for the Control. This increase in thermal stability was also shown for Sample 1 after 8 weeks of thermal aging.

Surprisingly, the average tensile strength values for Sample 2 are generally higher than those of Sample 1, even though about half the amount of DF-120 was used in the sizing composition applied to Sample 2 than that applied to Sample 1.

As shown in Table 3, improved tensile strength and heat stability at 185° C. is provided by including DF-120 in a sizing composition such as is set forth in Table 1 as applied to glass fibers.

The average values of percent tensile elongation for each set of 8 test specimens are set forth in Table 4 below.

TABLE 4

AVERAGE TENSILE ELONGATION

| WEEKS AGING AT 185° C. | CONTROL (%) | SAMPLE 1 | | SAMPLE 2 | |
|---|---|---|---|---|---|
| | | (%) | DIFFERENCE FROM CONTROL (%) | (%) | DIFFERENCE FROM CONTROL (%) |
| 0 | 2.902 | 2.811 | — | 2.832 | — |
| 1 | 2.209 | 2.329 | +5.4 | 2.707 | +22.54 |
| 2 | 1.325 | 1.332 | +0.5 | 1.593 | +20.2 |
| 3 | 1.091 | 1.020 | −6.4 | 1.283 | +17.6 |
| 4 | 1.105 | 1.055 | −6.3 | 1.191 | +7.8 |
| 5 | 0.8838 | 0.8559 | −3.2 | 0.8995 | +1.8 |
| 6 | 0.8287 | 0.8023 | −3.2 | 0.8361 | +0.9 |
| 7 | 0.7766 | 0.6893 | −11.2 | 0.8124 | +4.6 |
| 8 | 0.7898 | 0.7480 | −5.3 | 0.7923 | +0.3 |

As shown in Table 4, the average percent tensile elongation values for Sample 1 are higher than the Control for week 1 and 2. For weeks 3 through 8, the average percent tensile elongation values are somewhat lower than those of the control.

However, all of the average percent tensile elongation for Sample 2 are significantly higher than the average percent tensile elongation values for the Control. For example, for the first three weeks of aging at 185° C., the average percent tensile elongation values for Sample 2 are more than 15% higher than the average percent tensile elongation values for the Control.

Surprisingly, the average percent tensile elongation value for Sample 2 are generally higher than those of Sample 1 even though about half the amount of DF-120 was used in the composition applied to Sample 2 than that applied to Sample 1.

The data in Table 4 shows that improved tensile elongation and heat stability at 185° C. is provided by including DF-120 in a sizing composition such as is set forth in Table 1 as applied to glass fibers.

From the foregoing description, it can be seen that the present invention comprises curable compositions for coating substrates such as glass fibers which inhibit autooxidation of components of the coating and oxidation and degradation due to exposure of the coated substrate to oxygen and ozone in the air, secondary treatments and contact with other oxidizing agents in the environment. By inhibiting oxidation of the coating and contacting materials, resulting discoloration, thermal instability and deterioration in mechanical and surface properties of composites formed from such materials is provided.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A substrate having thereon the dried residue of a curable composition, the composition comprising (1) an antioxidant selected from the group consisting of (a) terpene materials; (b) vitamin materials different from the terpene materials; and (c) combinations thereof in an amount of about 0.001 weight percent to about 1 weight percent based upon the weight of the substrate, the substrate being selected from the group consisting of natural materials, thermoplastic materials, thermosetting materials, inorganic materials selected from the group consisting of silicates, aluminum oxide, silicon carbide, zinc oxide, basalt, mineral wool and magnesium carbonate, and combinations thereof; and (2) a film-forming material capable of forming a substantially uniform continuous coating on the substrate, the film-forming material being selected from the group consisting of polyolefins, polyamides, polyurethanes, polyesters, acrylic polymers, vinyl polymers, acetals, polyaryl sulfones, polyether sulfones, polyimides, polyetherketones, polyphenylene oxides, polyphenylene sulfides, polycarbonates, vinyl esters, epoxides, phenolics, aminoplasts and mixtures thereof.

2. The substrate according to claim 1, wherein the natural materials are selected from the group consisting of cotton, cellulose and wool.

3. The substrate according to claim 1, wherein the thermoplastic materials are selected from the group consisting of polyolefins, polyamides, thermoplastic polyurethanes, thermoplastic polyesters, acrylic polymers, vinyl polymers, acetals, polyaryl sulfones, polyether sulfones, polyimides, polyetherketones, polyphenylene oxides, polyphenylene sulfides, polycarbonates, derivatives and mixtures thereof.

4. The substrate according to claim 1, wherein the thermosetting materials are selected from the group consisting of thermosetting polyesters, vinyl esters, epoxides, phenolics, aminoplasts, thermosetting polyurethanes, derivatives and mixtures thereof.

5. The substrate according to claim 1, wherein the substrate is selected from the group consisting of fibers, plates, sheets, fabrics, rods, tubes, powders, beads, flakes and hollow spheres.

6. The substrate according to claim 1, wherein the terpene material contains an isoprene unit and derivatives thereof.

7. The substrate according to claim 6, wherein the terpene material is selected from the group consisting of terpenes and terpene derivatives.

8. The substrate according to claim 7, wherein the terpene material is selected from the group consisting of monoterpenes, sesquiterpenes, diterpenes, triterpenes and tetraterpenes.

9. The substrate according to claim 7, wherein the terpene material is selected from the group consisting of aliphatic terpene materials, aromatic terpene materials and cyclic terpene materials.

10. The substrate according to claim 9, wherein the terpene material is a cyclic terpene material which is selected from the group consisting of acyclic terpenes, monocyclic terpenes, bicyclic terpenes and polycyclic terpenes.

11. The substrate according to claim 1, wherein the terpene material is selected from the group consisting of vitamin A terpene materials, vitamin B terpene materials, vitamin D terpene materials, vitamin E terpene materials, vitamin K terpene materials, provitamins, derivatives and mixtures thereof.

12. The substrate according to claim 11, wherein the vitamin A terpene materials are selected from the group consisting of retinol, 3,4-didehydroretinol, retinal, vitamin A acetate, vitamin A palmitate, α-carotene, β-carotene, δ-carotene, γ-carotene, cryptoxanthin, isomers thereof and derivatives thereof.

13. The substrate according to claim 11, wherein the vitamin B terpene materials are selected from the group consisting of thiamine, cyanocobalamin, isomers thereof and derivatives thereof.

14. The substrate according to claim 11, wherein the vitamin D terpene materials are selected from the group consisting of ergocalciferol, cholecalciferol, 25-hydroxycholecalciferol, 22,23-dihydroergocalciferol, isomers thereof and derivatives thereof.

15. The substrate according to claim 11, wherein the vitamin E terpene materials are selected from the group consisting of tocol, alpha-tocopherol, beta-tocopherol, gamma-tocopherol, sigma-tocopherol, epsilon-tocopherol, $xi_1$-tocopherol, $xi_2$-tocopherol, eta-tocopherol, isomers thereof and derivatives thereof.

16. The substrate according to claim 11, wherein the vitamin K terpene materials are selected from the group consisting of phytonadione, menaquinone, isomers thereof and derivatives thereof.

17. The substrate according to claim 1, wherein the terpene material contains an aromatic ring.

18. The substrate according to claim 17, wherein the terpene material further comprises a heterocyclic ring fused with the aromatic ring, the heterocyclic ring having (1) a substituent selected from the group consisting of hydrogen and aliphatic groups having about 1 to about 10 carbon atoms and (2) a heteroatom in a ortho position to a bridge carbon atom of the aromatic ring, the heteroatom being selected from the group consisting of oxygen, sulfur, phosphorus, the aromatic ring having an electronegative substituent in a para position to the bridge carbon atom directly attached to the heteroatom, the electronegative substituent being selected from the group consisting of a hydroxyl group and a thiol group.

19. The substrate according to claim 18, wherein the terpene material is represented by the following formula (I):

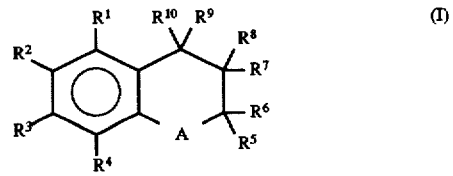

in which:

A is a heteroatom selected from the group consisting of oxygen, sulfur and phosphorus;

R² is an electronegative substituent selected from the group consisting of a hydroxyl group and a thiol group;

R¹, R³ and R⁴ are each independently selected from hydrogen and aliphatic groups having about 1 to about 10 carbon atoms; and R⁵, R⁶, R⁷, R⁸, R⁹ and R¹⁰ are each independently selected from the group consisting of hydrogen, aliphatic groups having about 1 to about 50 carbon atoms and alkenyl groups having about 1 to about 50 carbon atoms.

20. The substrate according to claim 1, wherein the vitamin material is free of terpene materials.

21. The substrate according to claim 1, wherein the vitamin material is a vitamin C material selected from the group consisting of ascorbic acid, ascorbyl palmitate, isomers thereof and derivatives thereof.

22. The substrate according to claim 1, wherein the antioxidant comprises about 0.0001 weight percent to about 50 weight percent of the composition on a total solids basis.

23. The substrate according to claim 1, further comprising water as a carrier in an amount adapted to provide a generally uniform coating upon the substrate.

24. The substrate according to claim 1, further comprising a second antioxidant material different from the antioxidant.

25. The substrate according to claim 24, wherein the second antioxidant material is selected from the group consisting of citric acid, butylated hydroxyanisole, butylated hydroxytoluene, lecithin, tartaric acid, monoglyceride citrate, stearyl citrate, monoisopropyl citrate, hindered phenols, diaryl amines, thioethers, quinones and phosphorus-containing materials.

26. The substrate according to claim 1, further comprising a component different from the antioxidant selected from the group consisting of lubricants, coupling agents, crosslinkers, plasticizers, humectants, emulsifiers, ultraviolet light stabilizers, colorants, antistatic agents, waxes and combinations thereof.

27. The substrate according to claim 26, wherein the film-forming material has functionality adapted to react with the antioxidant.

28. The substrate according to claim 26, wherein the film-forming material comprises about 0.0001 weight percent to about 99.9 weight percent of the composition on a total solids basis.

29. The substrate of claim 1, further having thereon a secondary coating composition.

* * * * *